(12) United States Patent
Venkataraman et al.

(10) Patent No.: US 9,635,014 B2
(45) Date of Patent: Apr. 25, 2017

(54) METHOD AND APPARATUS FOR AUTHENTICATING CLIENT CREDENTIALS

(71) Applicant: Samsung Electronics Co., Ltd., Suwon-si, Gyeonggi-do (KR)

(72) Inventors: Balakrishna Venkataraman, San Jose, CA (US); Antonios Dimitrios Broumas, Oakland, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 14/586,045

(22) Filed: Dec. 30, 2014

(65) Prior Publication Data

US 2015/0244711 A1    Aug. 27, 2015

Related U.S. Application Data

(60) Provisional application No. 61/942,901, filed on Feb. 21, 2014.

(51) Int. Cl.
| | |
|---|---|
| H04L 29/06 | (2006.01) |
| G06F 21/57 | (2013.01) |
| H04L 9/32 | (2006.01) |
| G06F 21/33 | (2013.01) |
| H04L 9/08 | (2006.01) |

(52) U.S. Cl.
CPC .......... *H04L 63/0823* (2013.01); *G06F 21/33* (2013.01); *G06F 21/57* (2013.01); *H04L 9/0863* (2013.01); *H04L 9/0897* (2013.01); *H04L 9/321* (2013.01); *H04L 9/3263* (2013.01); *H04L 63/0272* (2013.01); *H04L 63/0442* (2013.01); *H04L 63/0815* (2013.01)

(58) Field of Classification Search
None
See application file for complete search history.

(56) References Cited

U.S. PATENT DOCUMENTS

| | | | |
|---|---|---|---|
| 8,756,417 B1 * | 6/2014 | Gardner ................. | G06F 21/57 380/262 |
| 2008/0209206 A1 * | 8/2008 | Vaha-Sipila .......... | H04W 12/08 713/155 |
| 2009/0077383 A1 * | 3/2009 | de Monseignat ... | H04L 63/0823 713/175 |
| 2010/0077208 A1 | 3/2010 | Appiah et al. | |
| 2012/0084562 A1 * | 4/2012 | Farina .................... | G06F 21/575 713/168 |
| 2012/0108205 A1 | 5/2012 | Schell et al. | |
| 2012/0167162 A1 * | 6/2012 | Raleigh .................. | G06F 21/57 726/1 |
| 2012/0246470 A1 * | 9/2012 | Nicolson ................. | G06F 21/57 713/158 |
| 2013/0065578 A1 | 3/2013 | Raleigh et al. | |

(Continued)

*Primary Examiner* — Michael R Vaughan
(74) *Attorney, Agent, or Firm* — Jefferson IP Law, LLP

(57) ABSTRACT

An apparatus and method for storing authentication information on an electronic device are provided. The method includes receiving, by the electronic device, a unique key and a certificate matching the unique key in a secure environment of the electronic device, storing the unique key and the certificate matching the unique key in a secure environment of the electronic device, and wherein at least one of the unique key and the certificate matching the unique key identifies the electronic device.

56 Claims, 19 Drawing Sheets

(56) References Cited

U.S. PATENT DOCUMENTS

| | | | |
|---|---|---|---|
| 2013/0129087 A1* | 5/2013 | Qi | G06F 21/602 |
| | | | 380/44 |
| 2013/0227646 A1 | 8/2013 | Haggerty et al. | |
| 2013/0269011 A1 | 10/2013 | Wilson | |
| 2013/0311784 A1* | 11/2013 | Bleahen | G06F 21/31 |
| | | | 713/185 |
| 2014/0013406 A1* | 1/2014 | Tremlet | G06F 21/32 |
| | | | 726/5 |
| 2014/0089660 A1* | 3/2014 | Sarangshar | H04L 9/3234 |
| | | | 713/156 |
| 2014/0365769 A9* | 12/2014 | Eld | H04L 9/12 |
| | | | 713/168 |
| 2015/0347768 A1* | 12/2015 | Martin | G06F 21/62 |
| | | | 726/1 |
| 2016/0156594 A9* | 6/2016 | Inforzato | G06F 21/575 |
| | | | 713/168 |

* cited by examiner

C_Initialize
　　　C_GetSlotList
　　　C_OpenSession
　　　　　　C_Login
　　　　　　　　　C_FindObjectsInit
　　　　　　　　　C_FindObjects
　　　　　　　　　C_GetAttributeValue
　　　　　　　　　C_FindObjectsFinal C_DigestInit, C_Digest C_DecryptInit, C_Decrypt C_SignInit, C_Sign C_VerifyInit, C_Verify
　　　　　　C_Logout
　　　C_CloseSession
C_Finalize

FIG. 4D

METHOD AND APPARATUS FOR AUTHENTICATING CLIENT CREDENTIALS

CROSS-REFERENCE TO RELATED APPLICATION(S)

This application claims the benefit under 35 U.S.C. §119 (e) of a U.S. Provisional application filed on Feb. 21, 2014 in the U.S. Patent and Trademark Office and assigned Ser. No. 61/942,901, the entire disclosure of which is hereby incorporated by reference.

TECHNICAL FIELD

The present disclosure relates to an apparatus and method for generating and/or storing client credentials in a secure area of an electronic device. The present invention also relates to an apparatus and method for generating client authenticating credentials secured by a private key that will never leave the device. In addition, the present disclosure relates to an apparatus and method for generating and/or authenticating client credentials using a hardware certificate.

BACKGROUND

As a result of the increasing rate of malicious attacks on networks and/or applications, current development focuses on improving security for networks and/or applications. As part of the security for networks and/or applications, a user or device must be authenticated with the network and/or application before the user or device is granted access to certain resources protected by the network and/or application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating client credentials in an electronic device. Another aspect of the present disclosure is to provide an apparatus and method for authenticating a user using credentials stored in an electronic device.

In accordance with an aspect of the present disclosure, an electronic device is provided. The electronic device includes a secure environment, wherein the secure environment comprises a unique key, a certificate matching the unique key, and wherein at least one of the unique key and the certificate matching the unique key identifies the electronic device.

In accordance with another aspect of the present disclosure, a method for storing authentication information on an electronic device is provided. The method includes receiving, by the electronic device, a unique key and a certificate matching the unique key in a secure environment of the electronic device, and storing the unique key and the certificate matching the unique key in a secure environment of the electronic device, wherein at least one of the unique key and the certificate matching the unique key identifies the electronic device.

In accordance with another aspect of the present disclosure, a method for installing a client certificate to a client electronic device is provided. The method includes receiving, by an authentication application running on the client electronic device, a request for at least one of a client certificate and a key from a server, generating, by the authentication application, at least one of a client certificate and a key, communicating, by the client electronic device, at least one of the generated client certificate and the generated key to the server, receiving, by the authentication application, at least one of a signed client certificate and a key from the server, which signed the at least one of the client certificate and the key upon receipt thereof, and installing, by the authentication application, at least one of the signed client certificate and the key.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which:

FIG. 4D illustrates an example of a call sequence for an encryption/decryption protocol Application Programming Interface (API) according to various embodiments of the present disclosure;

Throughout the drawings, it should be noted that like reference numbers are used to depict the same or similar elements, features, and structures.

DETAIL DESCRIPTION

Figure 1:
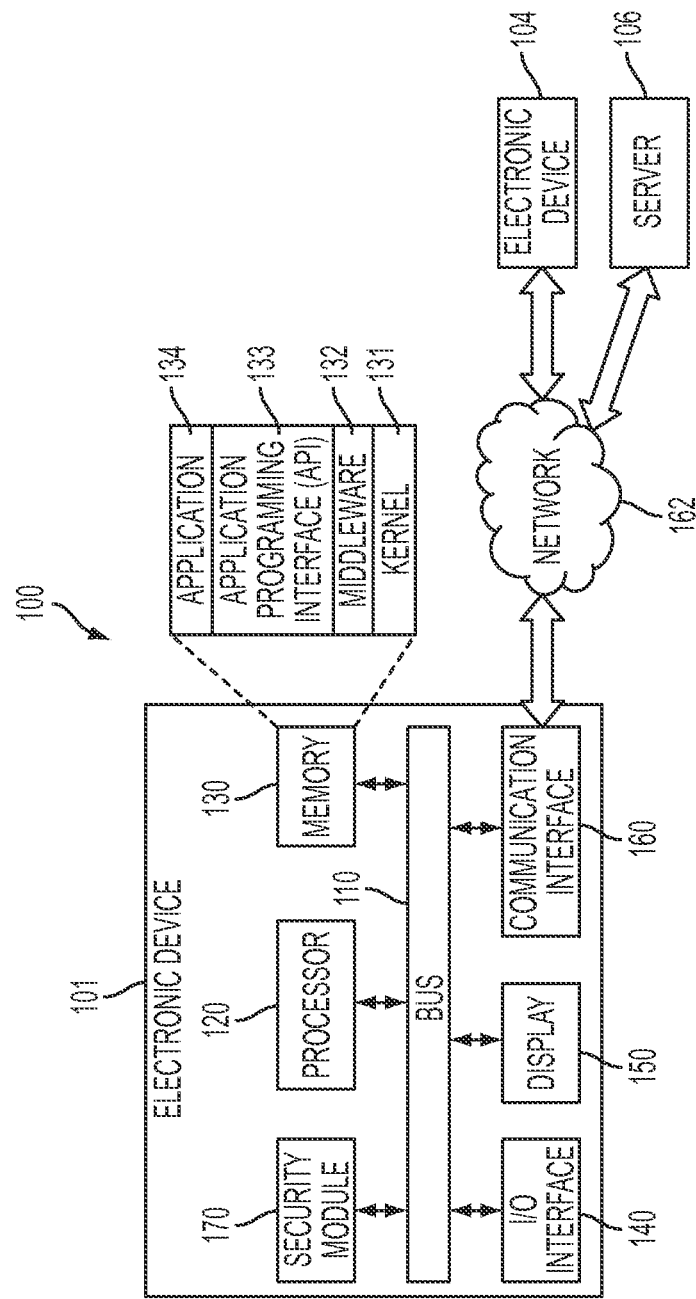
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed descriptions with reference to the accompanying drawings are provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to the related art, in order to enhance security of networks and/or applications, a method for authenticating a user or device uses smart cards or Common Access Cards (CACs) to support the authentication process. The smart cards or CACs provide trusted credentials that may be confirmed before granting access to certain resource protected by the network and/or application. For example, the smart cards or CACs may store a private key to be used in association with a public key for various authentication purposes.

A smart card is a physical card having integrated therewith an integrated circuit. Generally, smart cards use a Public Key Infrastructure (PKI) wherein the Integrated Circuit Chip (ICC) on the smart card stores an encrypted digital certificate issued from a PKI provider. Smart cards are also equipped with tamper resistant technologies.

CACs are generally a subset of smart cards with additional security features. For example, CACs may include a visual identification (e.g., a picture of the owner), a magnetic stripe, an ICC, a bar code, and Radio Frequency Identification (RFID) technology.

In order to access resources protected by the network and/or application which uses a smart card or CAC for authenticating a user, a client electronic device with which the user will attempt to access the network and/or application may be required to communicate with the applicable smart card or CAC in order to receive (e.g., extract) the appropriate certificates, or to otherwise prove the identity of the smart card or CAC by using private keys stored on the smart card or CAC for authentication. Such an authentication mechanism may be inconvenient to a user because a user is generally required to carry the applicable smart card or CAC (e.g., with the client electronic device, which may be an enterprise issued electronic device). In addition, such an authentication mechanism may require an enterprise to issue smart cards or CACs for users to gain access to the resources protected by the network and/or application. The enterprise may also have to issue enterprise issued electronic devices with which a user may use to access the resources protected by the network.

Various embodiments of the present disclosure include an apparatus, method, and system for authenticating client credentials without smart cards, CACs, the associated card readers, and/or the like.

Various embodiments of the present disclosure include an apparatus, method, and system for authenticating client credentials without the server and/or application having to determine whether a client electronic device is compromised. For example, various embodiments of the present disclosure include an apparatus and method for authenticating client credentials without the server and/or application having to determine whether an Operating System (OS) and/or framework is compromised as a result of security vulnerabilities.

Various embodiments of the present disclosure include an apparatus, method, and system for authenticating client credentials in which a client electronic device generates certificate signing requests in a zone of the client electronic device which is secure (e.g., an ARM TrustZone). Such a zone may be referred to as a secure zone. According to various embodiments of the present disclosure, the client electronic device may generate private keys within the secure zone of the client electronic device, and the client electronic device may be configured to ensure that the private keys never leave the secure zone of the client electronic device.

According to various embodiments of the present disclosure, client credentials (e.g., user specific and/or application specific credentials) may be generated in the secure zone (e.g., the SEE) of the electronic device using a high entropy hardware backed key generator. The client credentials may be randomly generated in the electronic device.

Various embodiments of the present disclosure include an apparatus, method, and system for storing client credentials in a secure zone of the client electronic device. For example, in contrast to the related art in which the smart card stores an encrypted digital certificate issued from a PKI provider, various embodiments of the present disclosure may include an apparatus, method, and system for storing an encrypted digital certificate in the secure zone of the client electronic device. The secure zone of the client electronic device may store one or more private keys and/or certificates.

Various embodiments of the present disclosure include an apparatus and method for authenticating client credentials using a standard cryptographic module. For example, the apparatus and method may be configured to use Public-Key Cryptography Standards 11 (PKCS11) for authenticating the client credentials. The apparatus and method may use a PKCS11 Application Programming Interface (API) for providing authentication. Because networks and/or applications that use smart cards for authentication generally use PKCS11 APIs, the apparatus and method according to various embodiments of the present disclosure may seamlessly integrate with such existing systems.

According to various embodiments of the present disclosure, a non-secure zone (e.g., a Normal Execution Environment (NEE)) may communicate with the secure zone (e.g., the SEE) using PKCS11 or similar protocol.

According to various embodiments of the present disclosure, unique credentials may be installed on the electronic device (e.g., the client electronic device). For example, the unique credentials may be installed in a secure zone (e.g., a special Secure Execution Environment (SEE)) of the electronic device. The unique credentials may be installed during manufacture of the electronic device. The unique credentials may comprise a unique key and a corresponding certificate. The unique credentials may be accessible only within the secure zone (e.g., the SEE). For example, the unique credentials may be accessible only by applications (e.g., SEE applications) within the secure zone (e.g., the SEE). The unique credentials may include data identifying the electronic device. For example, the certificate of the unique credentials may include the data identifying the electronic device. The data may be human-readable and/or machine-readable. According to various embodiments of the present disclosure, the root certification authority may be the electronic device manufacture.

According to various embodiments of the present disclosure, a remote enterprise or government Information Technology (IT) management system trusting the manufacturer may reliably identify the device based on the cryptographic evidence.

According to various embodiments of the present disclosure, trust and reliability may be strengthened by SEE run-time measurements that verify that the firmware is unaltered. For example, the SEE may ensure that the electronic device is in an uncompromised state. In particular, the SEE may ensure that the electronic device is in an uncompromised state when the SEE performs an authentication service.

According to various embodiments of the present disclosure, a device manager such as an enterprise (e.g., an enterprise network) may create (e.g., generate) credentials for an electronic device (e.g., a client electronic device) or user thereof. For example, after an electronic device is identified by an enterprise, the enterprise may create user specific and/or application specific credentials for the electronic device. The user specific and/or application specific credentials may be securely stored (e.g., installed) in the secure zone (e.g., the SEE) of the electronic device.

According to various embodiments of the present disclosure, a credential (e.g., a certificate) may be signed by an external Certification Authority (CA) and provisioned securely using an established protocol (e.g., Simple Certificate Enrollment Protocol (SCEP), Certificate Management Protocol (CMP), Certificate Management over CMS (CMC), and/or the like).

According to various embodiments of the present disclosure, credentials stored (e.g., installed) in the secure zone (e.g., the SEE) will never leave the SEE. The secure zone (e.g., the SEE) will prevent communication of credentials stored therein to an entity (e.g., an application, an electronic device, and/or the like) outside the secure zone (e.g., the SEE).

According to various embodiments of the present disclosure, credentials may be securely passed (e.g., communicated) to the secure zone (e.g., the SEE) of an electronic device. For example, user credentials, application credentials, and/or the like may be securely passed to the secure zone (e.g., the SEE) of the electronic device using a Trusted User Interface (TUI).

According to various embodiments of the present disclosure, passwords may be securely transferred (e.g., communicated) to the secure zone (e.g., the SEE) by controlling indirect access to the credentials. For example, PKCS11 passwords may be securely transferred to the secure zone (e.g., the SEE) controlling indirect access to private keys stored therein.

According to various embodiments of the present disclosure, keylogger attacks may be thwarted and failed login attempts may be securely recorded. For example, a trusted user interface is used to access the credentials. In order to access the credentials, a password may be required. Accordingly, in order to ensure that the credentials remain secure, the trusted user interface may prevent keylogging of the passwords, and/or the like, particularly in relation to accessing the credentials.

According to various embodiments of the present disclosure, credentials may be non-transferable between electronic devices. For example, the keys (e.g., the private keys) and certificates are non-transferable from electronic device to electronic device. The keys (e.g., the private keys) and corresponding certificates may be device specific. According to various embodiments of the present disclosure, cryptographic data may be safeguarded using device unique encryption. Cryptographic data can be protected in high security storage (e.g., a Secure Element (SE)). Storing the cryptographic data in a high security storage may make the cryptographic data resistant to hardware based attacks.

FIG. 1 illustrates a network environment including an electronic device according to various embodiments of the present disclosure.

Referring to FIG. 1, a network environment 100 includes an electronic device 101 (e.g., a client electronic device). The electronic device 101 may include a bus 110, a processor 120, a memory 130, an Input/Output (I/O) interface 140, a display 150, a communication interface 160, a security module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the security module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the security module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of the electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by the one or more applications 134 by assigning priorities for using system resources (e.g., the bus 110, the processor 120, the memory 130, and/or the like) of the electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at the electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with the electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, an enterprise network, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the security module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the security module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between the electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between the electronic device 101 and an external electronic device may be supported by, for example, at least one of the application 134, the API 133, the middleware 132, the kernel 131, the communication interface 160, and/or the like.

Figure 2:
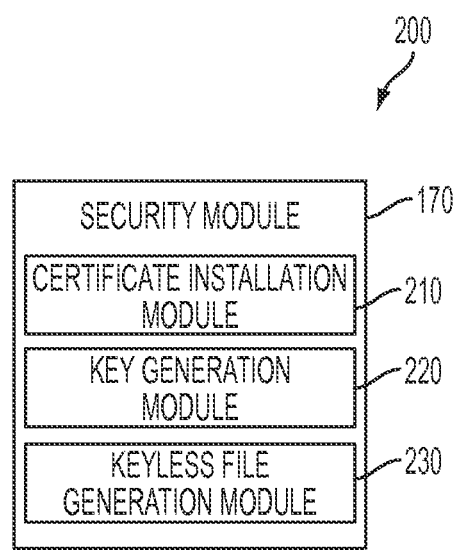
FIG. 2 illustrates a block diagram of a security module according to various embodiments of the present disclosure.

The security module 170 may, for example, process at least a part of information received from other components (e.g., the processor 120, the memory 130, the I/O interface 140, the communication interface 160, and/or the like), and provide various information, services, and/or the like to the user in various manners. For example, the security module 170 may control via the processor 120 or independently at least some of the functions of the electronic device 101 to authenticate the electronic device 101 in relation to another electronic device (e.g., the electronic device 104, the server 106, and/or the like). FIG. 2 will provide additional information regarding the security module 170.

FIG. 2 illustrates a block diagram of a security module according to various embodiments of the present disclosure.

Referring to FIG. 2, a secure zone 200 may include the security module 170 illustrated in FIG. 1. According to various embodiments of the present disclosure, the security module 170 may reside outside the secure zone 200.

According to various embodiments of the present disclosure, the secure zone 200 may be an area or environment of an electronic device with additional security relative to a normal zone of the electronic device. For example, an electronic device may include a normal operating environment (e.g., a normal zone) and a secure operating environment (e.g., a secure zone 200). The secure zone 200 may have a hardware guarantee that integrity of the applications, data, and/or the like within the secure zone 200 are not compromised.

According to various embodiments of the present disclosure, only preloaded applications may be loaded in the secure zone 200. For example, only applications, data, and/or the like that are installed by a manufacturer (e.g., an Original Equipment Manufacturer (OEM) manufacturer) of an electronic device may be executed in the secure zone 200 thereof. In other words, applications, data, and/or the like that are not installed by the OEM manufacturer may not be executed in the secure zone 200 (e.g., other entities may not have the requisite permissions to install applications, data, and/or the like in the secure zone 200). According to various embodiments of the present disclosure, new information may be stored in the secure zone 200, and such new information may be used by preexisting applications, and/or the like in the secure zone 200. For example, a credential may be stored in the secure zone 200, and an authentication application, or the like, which was installed in the secure zone 200 by the OEM manufacturer, may use the information newly stored in the secure zone 200.

According to various embodiments of the present disclosure, an OEM manufacturer may install a unique credential and a matching certificate in the secure zone 200 of the electronic device. For example, the OEM manufacturer may install a unique key (e.g., a private key) and a matching certificate in the secure zone 200 of the electronic device. The certificate may include may include specific device information (e.g., a device IDentifier (ID)). The certificate may be signed by an OEM root key. Accordingly, if an enterprise trusts the OEM manufacturer, then the enterprise may use the factory generated certificate in the authentication process. Thereafter, an enterprise manager may leverage (e.g., use) the unique key (e.g., the private key) and the certificate installed in the secure zone 200 for a secondary authentication. As a result, the need for an extra token in the process of secondary authentication that is required by related art is eliminated.

According to various embodiments of the present disclosure, an enterprise does not need to worry about securely pushing a private key to the electronic device (e.g., because the private key may be generated in the secure zone 200 or may be installed by the OEM manufacturer at, for example, the time of manufacture of the electronic device). Otherwise, if the enterprise is required to push or otherwise install the private key (or other credential) on the electronic device, then the private key may be vulnerable to a compromise in the security thereof. For example, from the time that the enterprise generates the private key to the time that the private key is installed in the secure zone 200, a malicious party may intercept or otherwise compromise the security of the private key. Consequently, generating the private key within the secure zone 200 or installing the private key in the secure zone 200 at the time of manufacture ensures that the private key is secure at all times. The electronic device may thereafter send a public key corresponding to the private key stored in the secure zone 200 to the enterprise.

As illustrated in FIG. 2, the security module 170 may include a certificate installation module 210, a key generation module 220, a keyless file generation module 230, and/or the like.

According to various embodiments of the present disclosure, the security module 170 may be used for authenticating an electronic device (e.g., a client electronic device). The security module 170 may ensure that all services that the security module 170 provides are trusted boot based services. According to various embodiments of the present disclosure, the security module 170 may accept installation of private keys and certificates (e.g., from an OEM manufacturer, an enterprise network, a user, and/or the like). According to various embodiments of the present disclosure, the security module 170 may generate a key and issue a certificate signing request upon receipt of a request therefor. According to various embodiments of the present disclosure, the security module 170 may be accessible via a standard encryption module or protocol (e.g., PKCS11 APIs). According to various embodiments of the present disclosure, the security module 170 may support Transport Layer Security (TLS) applications such as WiFi Extensible Authentication Protocol (EAP)-TLS applications, Virtual Private Network (VPN) applications, e-mail applications, and/or the like.

According to various embodiments of the present disclosure, the certificate installation module 210 may be configured to, for example, operatively receive a client certificate from a server, and install a client certificate (e.g., a signed client certificate) to a secure zone 200 of the client electronic device. The certificate installation module 210 may wrap and store a private key and/or certificate. The certificate installation module 210 may determine whether a token directory exists for a specific client, and create an applicable token directory if a token directory is determined not to exist for the specific client. The certificate installation module 210 may create and wrap a PIN file in the token directory (e.g., with a device key (SHK)+PIN) for the specific client. For example, the certificate installation module 210 may wrap and store a private key and/or certificate so as to wrap (e.g., with SHK+PIN) provided information and store the result in a new token file, if the data types correspond to a specified data type (e.g., TZ_CCM_RAW_PRIV_KEY, TZ_CCM_CERT, and/or the like). As another example, the certificate installation module 210 may unwrap a private key and/or certificate of a specific data type (e.g., TZ_CCM_WRAP_PRIV_KEY, and/or the like) and wrap the result with a certain wrapper (e.g., SHK+PIN). The certificate installation module 210 may provide an indication of (e.g., report on) a success or internal errors.

According to various embodiments of the present disclosure, the key generation module 220 may be configured to, for example, generate a key. For example, the key generation module 220 may generate an RSA key pair. As another example, the key generation module 220 may multiplex or wrap a private key with a device key. The key generation module 220 may return the private key wrapped with the device key along with a public key. The key general module 200 may be configured to generate the key (e.g., the private key) such that the private key never exists or otherwise communicated outside the secure zone 200.

According to various embodiments of the present disclosure, the keyless file generation module 230 may be configured to, for example, create a file (e.g., a keyless file) that may be used to indicate that a registration has been made. The keyless file generation module 230 may provide an indication of (e.g., report on) a success or internal errors.

According to various embodiments of the present disclosure, the security module 170 may be configured to perform a trusted boot check. The security module 170 may perform a trusted boot check to confirm whether the electronic device was boot to a known state (e.g., an uncompromised state). As an example, the secure zone 200 may include an application and/or the like that detects whether the electronic device boots to a known state (e.g., an uncompromised state). The application and/or the like included in the secure zone 200 may be considered a secure application because the application and/or the like resides in the secure zone 200. If the electronic device is determined to not boot to a known state (e.g., if the electronic device is determined to have boot to a compromised state), then the electronic device may prevent performing any authentications, encryptions, decryptions, and/or the like using an application, data, and/or the like residing in the secure zone 200. For example, if the secure zone 200 determines that the electronic device has boot to a compromised state (e.g., that the electronic device is compromised), then the secure zone 200 may not perform any authentications, encryptions, decryptions, and/or the like using an application, data, and/or the like residing in the secure zone 200. The secure zone 200 may not use the privet key stored therein if the electronic device (e.g., the secure zone 200) determines that the electronic device was boot to an unknown state (e.g., a compromised state).

Figure 3A:
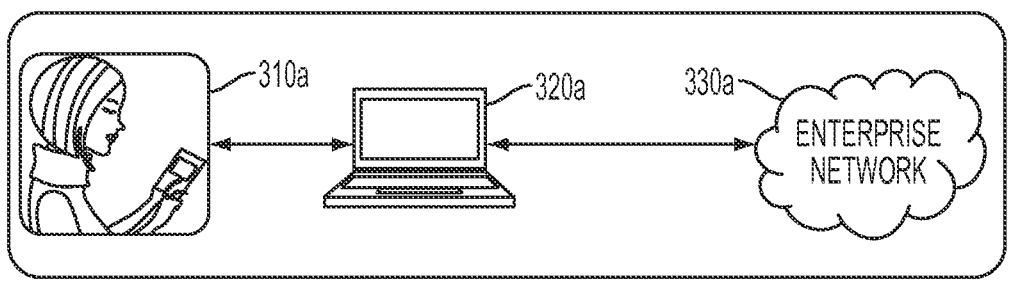
FIG. 3A illustrates a procedure for authenticating a user of a client electronic device.

FIG. 3A illustrates a procedure for authenticating a user of a client electronic device.

Referring to FIG. 3A, a user may attempt to connect to an enterprise network 330a with a client electronic device 310a (e.g., a smartphone) via an approved electronic device 320a (e.g., a corporate liable laptop). For example, the user may attempt to connect to the enterprise network 330a to gain access to resources protected by the enterprise network 330a.

According to various embodiments of the present disclosure, the client electronic device 310*a* may communicate with the approved electronic device 320*a* using at least one communication technology and/or protocol. For example, the client electronic device 310*a* and the approved electronic device 320*a* may communicate using Bluetooth technology, WiFi Direct technology, NFC technology, IrDA technology, and/or the like.

The enterprise network 330*a* may attempt to authenticate the user before granting the user access to the enterprise network 330*a*. For example, the enterprise network 330*a* may request that the user prove the user's identity using a first factor authentication. As an example, the first factor authentication may include the user entering user credentials.

The approved electronic device 320*a* communicates with the client electronic device 310*a* for performing a second factor authentication. For example, the approved electronic device 320*a* may communicate with the client electronic device 310*a* in order to retrieve the applicable certificates (e.g., security certificates) and to satisfy requirements to prove the existence of the associated private keys. The approved electronic device 320*a* may communicate the applicable certificates to the enterprise network 330*a*.

Figure 3B:
FIG. 3B illustrates a procedure for authenticating a client electronic device according to various embodiments of the present disclosure.

FIG. 3B illustrates a procedure for authenticating a user of a client electronic device according to various embodiments of the present disclosure.

Referring to FIG. 3B, a user may attempt to connect to an enterprise network 330*b* with a client electronic device 310*b* (e.g., a smartphone). For example, the user may attempt to connect to the enterprise network 330*b* to gain access to resources protected by the enterprise network 330*b*.

According to various embodiments of the present disclosure, the client electronic device 310*b* comprises trusted credentials that the enterprise network 330*b* may use to authenticate the client electronic device 310*b* to determine whether the client electronic device 310*b* is an approved electronic device (e.g., an electronic device permitted to gain access to the enterprise network 330*b*). According to various embodiments of the present disclosure, the enterprise network 330*b* does not need to determine the level of security of the client electronic device 310*b* (e.g., determine whether security of the client electronic device is compromised). For example, the trusted credentials may be stored in a secure zone (e.g., a secure environment) of the client electronic device 310*b*. The authenticity and/or security of the trusted credentials may be hardware guaranteed by the client electronic device 310*b*.

According to various embodiments of the present disclosure, the client electronic device 310*b* may be configured to include a hardware module that may enforce a separation of data that is identified as secure from data that is not identified as secure. For example, the hardware module may isolate secure data from insecure data (e.g., so as to create a secure environment storing and otherwise using secure data or applications associated therewith). The hardware module may secure memory storing secure data from software operations (e.g., malicious software attacks). According to various embodiments of the present disclosure, the client electronic device 310*b* includes an integrated authentication module.

According to various embodiments of the present disclosure, the client electronic device 310*b* may include a zone of memory that may store secure data (e.g., in isolation from insecure data).

According to various embodiments of the present disclosure, an authentication application (e.g., a Client Certificate Management (CCM) application) may be stored in the zone of memory used to store secure data (e.g., a memory of the secure zone). The authentication application may determine a security state of the client electronic device 310*b*. For example, the authentication application may determine whether the client electronic device 310*b* is compromised. The authentication application may determine whether the client electronic device 310*b* is compromised by performing a trusted boot check. According to various embodiments of the present disclosure, the authentication application may determine whether to provide services according to the determination of the security state of the client electronic device 310*b*. For example, if the authentication application determines that the client electronic device 310*b* is secure (e.g., that the client electronic device 310*b* is not compromised), then the authentication application may determine to provide an applicable service (e.g., an authentication service, such as, for example, signing a certificate). In contrast, if the authentication application determines that the client electronic device 310*b* is not secure (e.g., that the client electronic device 310*b* is compromised), then the authentication application may determine not to provide applicable services. For example, in response to determining that the client electronic device 310*b* is not secure, the authentication application may prevent the client electronic device 310*b* from performing an authentication service (e.g., signing a certificate or otherwise using a private key stored in the secure zone).

According to various embodiments of the present disclosure, the authentication application may be a virtual smartcard.

According to various embodiments of the present disclosure, the secure zone may store a client certificate that may be installed by an enterprise network 330*b* or an administrator thereof. For example, the enterprise network 330*b* or the administrator thereof may install the client certificate into the authentication application.

According to various embodiments of the present disclosure, an enterprise network 330*b* may securely authenticate a client electronic device 310*b* that is performing an authentication process and that provides the applicable client certificate. For example, because the authentication application may prohibit the authentication process or the communication of the client certificate when the client electronic device 310*b* is in a compromised state, the enterprise network may infer that a client electronic device 310*b* performing the authentication process and providing the applicable client certificate is an authenticated device.

According to various embodiments of the present disclosure, the enterprise network 330*b* may use a certificate already loaded (e.g., installed) on the client electronic device 310*b*. For example, a client electronic device 310*b* may be preloaded with a certificate signed by the OEM's root key. The certificate may comprise metadata that uniquely identifies the client electronic device 310*b* (e.g., an International Mobile Station Equipment Identity (IMEI), a WiFi Media Access Control (MAC) address, and/or the like). Accordingly, rather than installing a client certificate into the client electronic device 310*b*, the enterprise network 330*b* may register the client electronic device 310*b* into the enterprise network 330*b* using the certificate already loaded on the client electronic device 310*b*. According to various embodiments of the present disclosure, if the enterprise network 330*b* registers the client electronic device 310*b* using a certificate already loaded on the client electronic device 310*b*, then the enterprise network 330*b* may ensure that the certificate comprises a unique identifier of the client electronic device 310b (e.g., the IMEI address, the WiFi MAC address, and/or the like), and/or ensure that the certificate is signed by the applicable OEM root key.

Figure 4A:
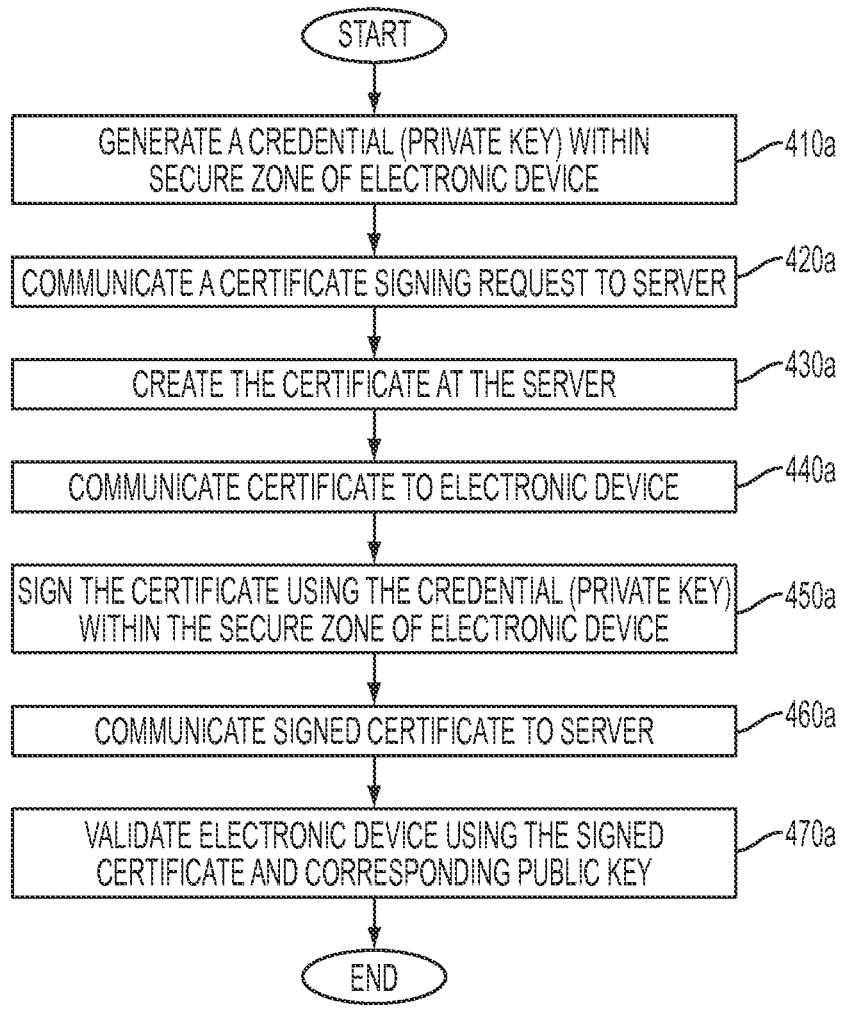
FIG. 4A illustrates a flowchart for authenticating a client electronic device according to various embodiments of the present disclosure.

FIG. 4A illustrates a flowchart for authenticating a client electronic device according to various embodiments of the present disclosure.

Referring to FIG. 4A, at operation 410a, the client electronic device generates credential within the secure zone of the client electronic device. For example, the client electronic device may generate a private key/public key pair. The client electronic device may generate the private key/public key pair within the secure zone of the client electronic device. The client electronic device may generate the private key/public key pair in response to a request from an enterprise network (e.g., a server). For example, the client electronic device may generate the private key/public key pair during a registration process in which the client electronic device registers with (e.g., as an approved user of) the enterprise network.

At operation 420a, the client electronic device may communicate a certificate signing request to the enterprise network. The client electronic device may communicate the public key (e.g., that is associated with the generated private key) to the enterprise network.

At operation 430a, the enterprise network may generate (e.g., create) a certificate for the private key/public key pair. The enterprise network may generate the certificate using the public key.

At operation 440a, the enterprise network may communicate the certificate to the client electronic device. The enterprise network may communicate the certificate to the client electronic device as part of an authentication procedure (e.g., to validate the electronic device). For example, in response to an attempt to access the enterprise network, the enterprise network may communicate the certificate to the client electronic device. As another example, the enterprise network may communicate the certificate to the client electronic device during registration of the client electronic device with the enterprise network.

At operation 450a, the client electronic device may sign the certificate using the generated credential within the secure zone of the client electronic device. For example, the client electronic device may sign the certificate using the generated private key stored within the secure zone of the client electronic device. The client electronic device may sign the certificate using the private key in response to a request from the enterprise network. For example, the enterprise network may request a signed certificate from the client electronic device in response to a request to access the enterprise network.

At operation 460a, the client electronic device may communicate the signed certificate to the enterprise network.

At operation 470a, the enterprise network may validate the client electronic device using the signed certificate. For example, the enterprise network may confirm that the certificate was signed by the private key. The enterprise network may use the public key to confirm that the certificate was signed by the private key. If the enterprise network determines that the certificate was signed by the private key (e.g., that the client electronic device has been validated), then the enterprise network may provide access thereto to the client electronic device.

Figure 4B:
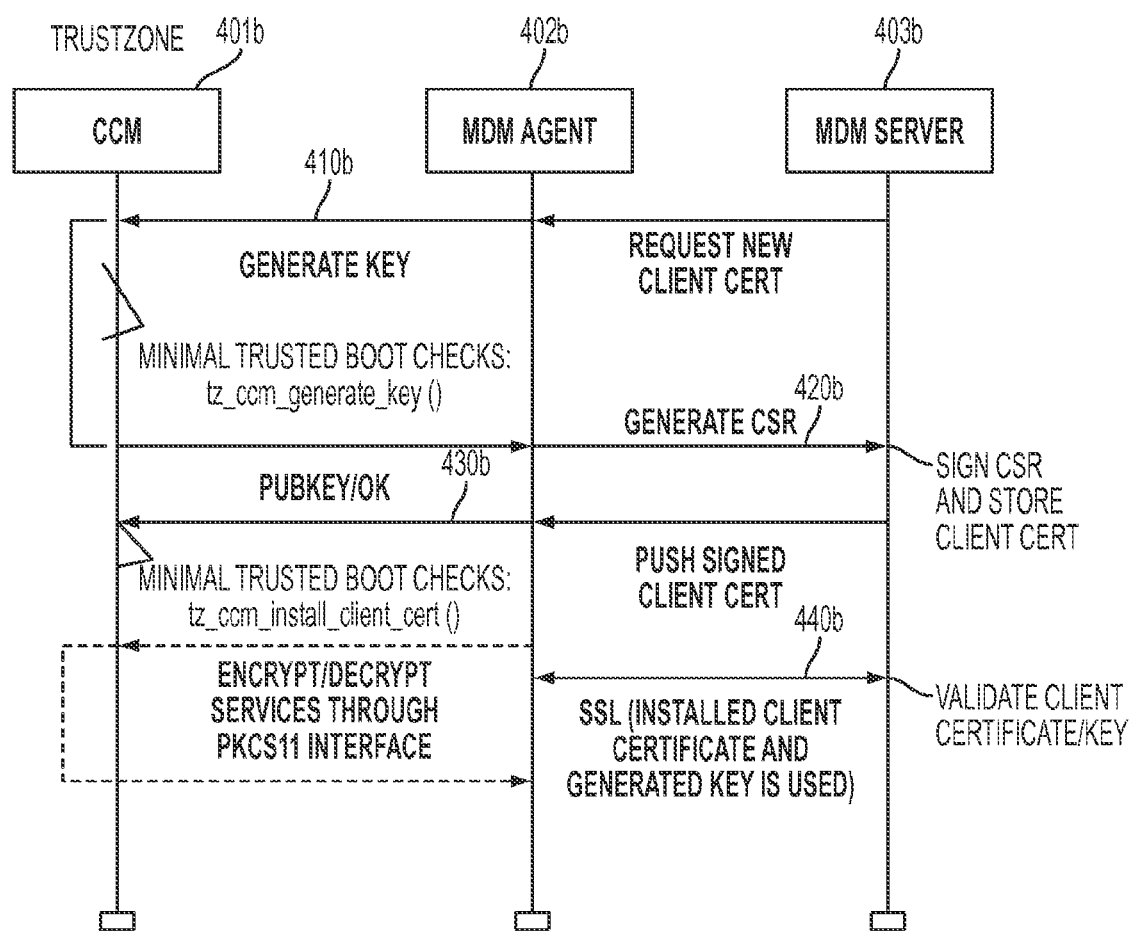
FIG. 4B illustrates a procedure for authenticating a client electronic device according to various embodiments of the present disclosure.

FIG. 4B illustrates a procedure for authenticating a client electronic device according to various embodiments of the present disclosure.

Referring to FIG. 4B, at operation 410b, the client electronic device may operatively receive a request for a new client certificate from an enterprise (e.g., an enterprise network 403b such as a Mobile Device Management (MDM) server). For example, an authentication application 401b (e.g., the CCM application) installed on the client electronic device may receive the request for a new client certificate. The authentication application 401b may be stored or otherwise installed in a secure zone of the client electronic device. For example, the authentication application 401b may be executed in a secure environment of the client electronic device. The authentication application 401b may receive the request for a new client certificate directly from the enterprise network 403b (e.g., the MDM server), or from the enterprise network 403b (e.g., the MDM server) via a security agent 402b (e.g., a KNOX agent). The security agent 402b (e.g., the KNOX agent) may reside on the client electronic device. For example, the security agent 402b (e.g., the KNOX agent) may reside in a non-secure zone of the client electronic device (e.g., the security agent 402b may be executed in a normal operating environment of the client electronic device).

If the authentication application 401b receives a request for a new client certificate at operation 410b, then the authentication application 401b may generate a key. For example, the authentication application 401b may generate an RSA key pair (e.g., an RSA key pair having 2048-bit, 65537 exponent). The authentication application 401b may return a public key and a wrapped private key. The wrapped private key may be a private key wrapped with a device key. The authentication application 401b may return the public key and the wrapped private key through buffers managed by a caller.

According to various embodiments of the present disclosure, the authentication application 401b may load a key generator API (e.g., tz_ccm_generate_key) when the authentication application 401b receives the request for a new client certificate. According to various embodiments of the present disclosure, the key generator API may generate the wrapped private key. The key generator API may be stored or otherwise installed in the secure zone of the client electronic device. The key generator API may be executed in the secure environment of the client electronic device.

Thereafter, at operation 420b, the authentication application 401b may communicate (e.g., transmit) the public key to the enterprise network 403b (e.g., the MDM server). The authentication application may communicate the public key to the enterprise network 403b (e.g., the MDM server) via the security agent 402b. According to various embodiments of the present disclosure, the authentication application 401b may communicate the public key along with a Certificate Signing Request (CSR). According to various embodiments of the present disclosure, the security agent 402b (e.g., the KNOX agent) may communicate a CSR to the enterprise network 403b (e.g., the MDM server) upon receiving the private key.

The enterprise network 403b (e.g., the MDM server) (or an applicable authenticating authority) may sign the CSR and store the client certificate.

Thereafter, at operation 430b, the enterprise network 403b (e.g., the MDM server) may communicate the signed client certificate to the client electronic device (e.g., the authentication application 401b). The enterprise network 403b (e.g., the MDM server) may communicate the signed client certificate to the client electronic device via a push communication technology.

According to various embodiments of the present disclosure, upon receipt of the signed client certificate, the client electronic device may store and/or install the signed client certificate. As an example, the authentication application 401b may install the signed client certificate. The authentication application 401b may load a certificate installation API (e.g., tz_ccm_intall_client_ccm) when the authentication application 401b receives the signed client certificate. The certificate installation API may install the signed client certificate. The certificate installation API may install the signed client certificate with a private key. As an example, the certificate installation API may install an x509 signed client certificate with a private key.

Thereafter, at operation 440b, the client electronic device the enterprise network 403b (e.g., the MDM server) may encrypt/decrypt services provided to the authentication application 401b through a specific encryption module or protocol (e.g., using a PKCS11 interface).

According to various embodiments of the present disclosure, the enterprise network 403b (e.g., the MDM server) may communicate with the client electronic device (e.g., the security agent 402b and/or the authentication application 401b) using a security protocol. For example, the enterprise network 403b (e.g., the MDM server) may communicate with the client electronic device (e.g., the security agent 402b and/or the authentication application 401b) using a Secure Sockets Layer (SSL) protocol and the installed client certificate and a generated key (e.g., generated by the authentication application). The enterprise network 403b (e.g., the MDM server) may authenticate the client electronic device by validating the client certificate and the generated key.

According to various embodiments of the present disclosure, the authenticating party (e.g., the enterprise network 403b such as the MDM server) may authenticate a client electronic device using a certificate signed by the client electronic device using the private key stored in the secure zone of the client electronic device. For example, the authenticating party may authenticate a client electronic device using a key pair (e.g., a private key and a public key) generated within a secure zone of the client electronic device. According to various embodiments of the present disclosure, the combination of the enterprise signed certificate and the key generated within the client electronic device is unique to the client electronic device and the enterprise. As an example, authentication of the client electronic device is based on the PIN/UID established during installation of the signed client certificate. According to various embodiments of the present disclosure, because of the unique combination of the enterprise signed certificate and the key generated within the client electronic device, and the enterprise does not need to be concerned about securely pushing the signed client certificate to the client electronic device.

Figure 4C:
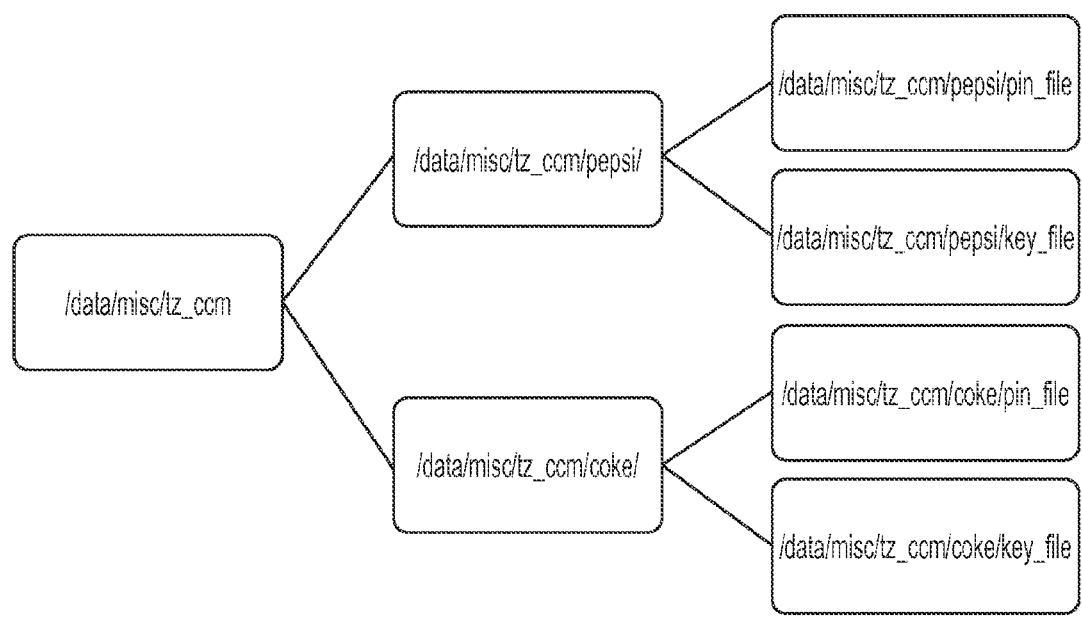
FIG. 4C illustrates an organization of authentication tokens according to various embodiments of the present disclosure.

FIG. 4C illustrates an organization of authentication tokens according to various embodiments of the present disclosure.

Referring to FIG. 4B, a token organization is illustrated. For example, FIG. 4B illustrates an organization and file structure of tokens stored in an authentication application installed in a secure zone of the client electronic device.

TABLE 1

| File Name: UID_label_token-name_type | | | | | | |
|---|---|---|---|---|---|---|
| File name hash | LEN/UID | PIN | TYPE | Trusted Boot? | LEN | Binary Data |
| YYY | 1 | XXXX | CERT | TRUE | In bytes | 010100101... |

Table 1 illustrates a key file structure. For example, Table 1 illustrates a structure of the key file for object storage.

According to various embodiments of the present disclosure, the key file is wrapped with a key derived from a PIN and the device key (SHK) (e.g., PIN+SHK). According to various embodiments of the present disclosure, the key files may be stored in a specific directory of the client electronic device. In particular, the key files may be stored in a specific directory of the secure zone of the client electronic device. The key files may be stored in a directory associated with the authentication application installed in the secure zone of the client electronic device (e.g., /data/misc/tz_ccm/<token-name>). According to various embodiments of the present disclosure, at least one of a UID, an object type, and an object label to identify a file storing an object. According to various embodiments of the present disclosure, the default key for the authentication application (e.g., the default CCM key) may have a different file structure.

TABLE 2

| File name: UID_token-name | | |
|---|---|---|
| File name hash | LEN/UID | LEN/PIN |
| XXXX | 1 | XXXX |

Table 2 illustrates a PIN file structure. For example, Table 2 illustrates a structure of the PIN file for object storage.

According to various embodiments of the present disclosure, the PIN file may be wrapped with a key derived from a PIN and the device key (SHK) (e.g., PIN+SHK). According to various embodiments of the present disclosure, the PIN files may be stored in a specific directory of the client electronic device. In particular, the PIN files may be stored in a specific directory of the secure zone of the client electronic device. The PIN files may be stored in a directory associated with the authentication application installed in the secure zone of the client electronic device (e.g., /data/misc/tz_ccm/<client-name>).

TABLE 3

| File name: UID_label_token-name_DEFAULT | | | | | |
|---|---|---|---|---|---|
| File name hash | LEN/UID | PIN | TYPE | LEN | Binary Data |
| YYY | AAA | XXXX | DEFAULT | Zero | <empty> |

Table 3 illustrates a default key file structure. For example, Table 3 illustrates a structure of the default key file for object storage.

According to various embodiments of the present disclosure, the file structure of the default key file is similar to the file structure of other key files. According to various embodiments of the present disclosure, a keyless file may be created in a specific directory of the secure zone of the client electronic device. For example, the keyless file may be created in a directory associated with the authentication application installed in the secure zone of the client electronic device (e.g., /data/misc/tz_ccm/<token-name> directory). According to various embodiments of the present disclosure, the type field of the file structure may indicate whether the file is relevant to the default key. According to various embodiments of the present disclosure, no key information is provided in the keyless file associated with the default key. The actual default key data may be stored in a location specified by a device manufacturer.

According to various embodiments of the present disclosure, the default client certificate and key may be generated and maintained by a device manufacturer. For example, the default client certificate and key may be generated only once for a respective client electronic device. According to various embodiments of the present disclosure, the default client certificate and key may be encrypted by a client electronic device unique hardware key.

TABLE 4

| Certificate/Key Attributes | Expected Values |
|---|---|
| Key size | 2048 bit |
| Exponent Value | 65537 |
| Issues to/Issued by | Device Manufacturer (e.g., Samsung Corporation) |
| Signature Algorithm | SHA256 RSA |
| Signature Hash Algorithm | SHA256 |
| Subject | OU: for client authentication use only |
| | OU: <will encode the device (SoC) ID> |
| | OU: <encode carrier, mobile name, dates/times of creation> |
| | OU = Samsung Mobile |
| | CN Samsung Corporation |
| | L = Suwon City |
| | C - KR |
| Key Usage | Digital Signature, Non-Repudiation, Key Encipherment, Data Encipherment (f0) |
| Certificate thumbprint algorithm | SHA256 |
| extendedKeyUsage | Client Authentication |

Table 4 illustrates attributes for the default key and/or client certificate.

According to various embodiments of the present disclosure, services may be encrypted/decrypted using a specific encryption module or protocol (e.g., using a PKCS11 interface).

Table 5 illustrates a relationship between normal PKCS11 APIs (e.g., PKCS11 APIs used according to the related art), and PKCS11 APIs for encrypting/decrypting services within the secure zone of the client electronic device.

FIG. 4D illustrates an example of a call sequence for an encryption/decryption protocol API according to various embodiments of the present disclosure.

Referring to FIG. 4D, a call sequence for calling a PKCS11 API is illustrated.

According to various embodiments of the present disclosure, the authentication application (e.g., the CCM) performs minimal trusted boot checks to determine a system state before any services are provided. The extent of the minimal trusted boot checks may be configurable on a per-key basis. For example, the extent of the minimal trusted boot checks may be configured during certificate installation to the secure zone of the client electronic device. The authentication application may perform the minimal trusted boot checks to confirm that the client electronic device has boot into a known state (e.g., an uncompromised state).

According to various embodiments of the present disclosure, a certificate and/or key install and/or generation request may indicate a security level. According to various embodiments of the present disclosure, the authentication application may use the indicated security level to determine the extent of the minimal trusted boot checks that need to be performed before providing services. For example, the authentication application uses the registered security level to determine the need to perform trusted boot checks.

According to various embodiments of the present disclosure, the trusted boot checks may include a Warranty Violation (WV) fuse or WV string secure memory checks, and a measurement validation.

According to various embodiments of the present disclosure, the trusted boot checks may not include PKM dashboard and/or RKP checks.

TABLE 5

| Normal World (PKCS11 API) | TZ CCM API | Description |
|---|---|---|
| C_Initialize | TZ_C_Initialize | Initializes Cryptoki |
| C_Finalize | TZ_C_Finalize | Clean up miscellaneous Cryptoki-associated resources |
| C_OpenSession | TZ_C_OpenSession | Opens a connection between an application callback for token insertion |
| C_CloseSession | TZ_C_CloseSession | Closes a session |
| C_Login | TZ_C_Login | Logs into a token |
| C_Logout | TZ_C_Logout | Logs out of a token |
| C_GetSlotList | TZ_C_GetSlotList | Obtains a list of slots in the system |
| C_FindObjectsInit | TZ_C_FindObjectsInit | Initializes an object search operation |
| C_FindObjects | TZ_C_FindObjects | Continues an object search operation |
| C_GetAttributeValue | TZ_C_GetAttributeValue | Obtains an attribute value of an object |
| C_FindObjectsFinal | TZ_C_FindObjectsFinal | Finishes an object search operation |
| C_SignInit | TZ_C_SignInit | Initializes a signature operation |
| C_Sign | TZ_C_Sign | Signs single-part data |
| C_DecryptInit | TZ_C_DecryptInit | Initializes a decryption operation |
| C_Decrypt | TZ_C_Decrypt | Decrypts single-part encrypted data |
| C_DigestInit | TZ_C_DigestINit | Initializes a message-digesting operation |
| C_Digest | TZ_C_Digest | Digests single-part data |
| C_VerifyInit | TZ_C_VerifyInit | Initializes a verification operation |
| C_Verify | TZ_C_Verify | Verifies a signature on single-part data |

According to various embodiments of the present disclosure, an authentication application installed in a secure zone of the client electronic device may be configured to use a standard cryptography protocol for encrypting/decrypting services. For example, the authentication application may be configured to use PKCS11.

According to various embodiments of the present disclosure, all tokens and metadata files may be stored in an Encrypting File System (EFS) using trustlet wrap APIs.

According to various embodiments of the present disclosure, a security module (e.g., SEAndroid) may be implemented to prevent deletion and/or modification of tokens and/or metadata files stored in the EFS.

According to various embodiments of the present disclosure, PIN files and/or key files may be read into a specific location in the secure zone of the client electronic device. For example, the PIN files and/or key files may be read into a standard location in the secure zone of the client electronic device. As an example, if the client electronic device transitions to an INIT (e.g., initialize) state, then any PIN files and/or key files may be wiped (e.g., deleted) from the secure zone of the client electronic device—hence the need to read the PIN files and/or key files into the secure zone of the client electronic device.

According to various embodiments of the present disclosure, installation operations may follow trusted boot checks. According to various embodiments of the present disclosure, installation operations may always follow trusted boot checks.

According to various embodiments of the present disclosure, cryptography operations may follow trusted boot checks. For example, cryptography operations may follow trusted boot checks if such minimal trusted boot checks are registered during the applicable installation operation.

According to various embodiments of the present disclosure, the client electronic device may be configured to ensure that the private keys never leave the secure zone of the client electronic device.

According to various embodiments of the present disclosure, the authentication application (e.g., the CCM) may be used for EAP-TLS for enterprise WiFi, e-mail authentication, VPN authentication (e.g., with client certificates such as, for example, SSL).

According to various embodiments of the present disclosure, EAP-TLS may correspond to an authentication mechanism to authorize access to wireless networks (e.g., WiFi). For example, EAP-TLS may support certificate-based mutual authentication and key derivation. According to various embodiments of the present disclosure, TLS may be more robust when used in connection with client certificates.

Figure 5A:
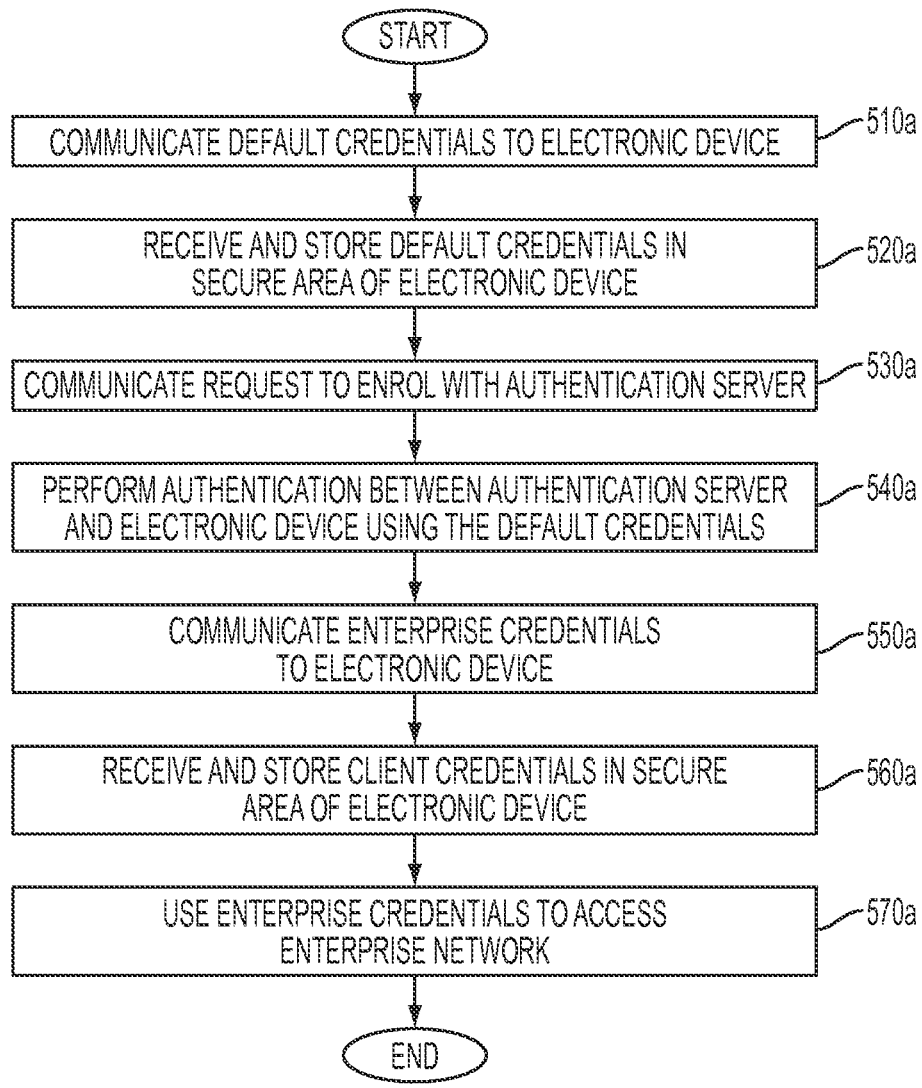
FIG. 5A illustrates a flowchart for authenticating a client electronic device according to various embodiments of the present disclosure.

FIG. 5A illustrates a procedure for authenticating a client electronic device according to various embodiments of the present disclosure.

Referring to FIG. 5A, at operation 510a, default credentials are communicated to a client electronic device. The default credentials may correspond to a default certificate and default key (e.g., a default private key). An enterprise (e.g., an enterprise network) may communicate the default credentials to the client electronic device.

At operation 520a, the client electronic device receives the default credentials. The client electronic device stores (e.g., installs) the default credentials in the secure zone of the client electronic device. The client electronic device may only store the default credentials in the secure zone of the client electronic device if the client electronic device is in an uncompromised state. For example, the client electronic device may determine whether the client electronic device is in an uncompromised state before storing the default credentials in the secure zone of the client electronic device. The client electronic device may determine whether the client electronic device is in an uncompromised state by performing one or more trusted boot checks.

At operation 530a, the client electronic device communicates a request to enroll or otherwise register with the enterprise network. For example, the client electronic device communicates a request to enroll or otherwise register with an authentication server of the enterprise network. The client electronic device may communicate the default credentials (or a portion thereof) to the enterprise network with the request to enroll/register with the enterprise network. For example, the client electronic device may communicate a default certificate to the enterprise network.

At operation 540a, authentication is performed between the client electronic device and the enterprise network using the default credentials. For example, the client electronic device may sign the default certificate using the default private key stored in the secure zone of the client electronic device. The enterprise network may validate the client electronic device using a corresponding default public key.

At operation 550a, the enterprise (e.g., the enterprise network) may communicate client credentials (e.g., enterprise credentials) to the client electronic device. For example, the enterprise may communicate the client credentials to the client electronic device in response to authenticating the client electronic device using the default credentials. The client credentials may be a private key and corresponding certificate associated with the enterprise network. The client credentials may be unique for the client electronic device (e.g., the client credentials may be used for a unique identification of the client electronic device in relation to the enterprise network). The enterprise may communicate the credentials to the client electronic device only if the client electronic device is authenticated with the enterprise using the default credentials.

At operation 560a, the client electronic device receives the client credentials. The client electronic device may receive the client credentials from the enterprise (e.g., the enterprise network). The client electronic device stores (e.g., installs) the client credentials in the secure zone of the client electronic device. The client electronic device may only store the client credentials in the secure zone of the client electronic device if the client electronic device is in an uncompromised state.

At operation 570a, the client electronic device may use the client credentials to access the enterprise network. For example, the enterprise network may authenticate the client electronic device using the client credentials.

Figure 5B:
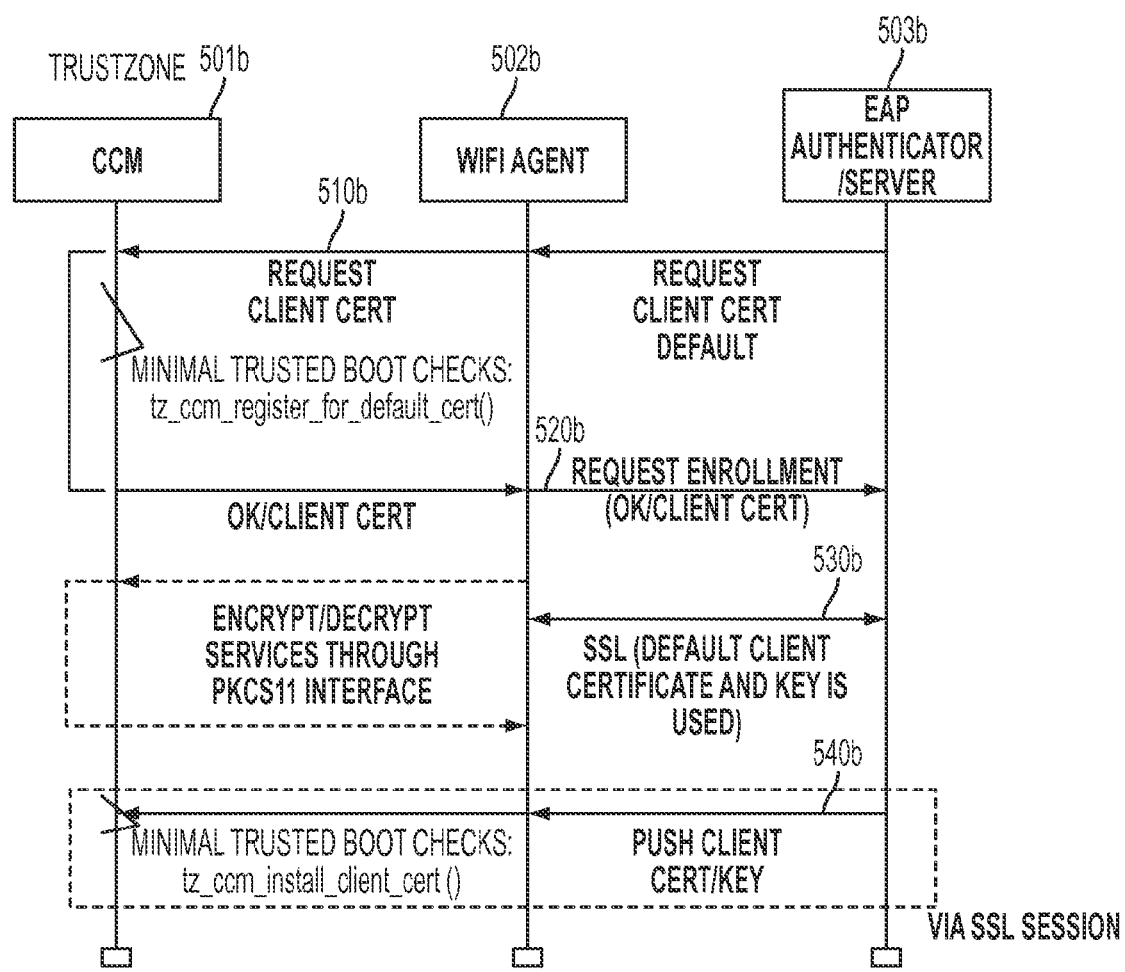
FIG. 5B illustrates a procedure for authenticating a client electronic device according to various embodiments of the present disclosure.

FIG. 5B illustrates a procedure for authenticating a client electronic device according to various embodiments of the present disclosure.

Referring to FIG. 5B, an example in which a connection between a client electronic device and a wireless network is authenticated.

At operation 510b, the client electronic device may operatively receive a request for a default client certificate from an enterprise network 503b (e.g., an EAP authenticator server). For example, an authentication application 501b (e.g., the CCM application) installed on the client electronic device may receive the request for a default client certificate. The authentication application 501b may receive the request for a default client certificate directly from the enterprise network 503b (e.g., the EAP authenticator server), or from the enterprise network 503b (e.g., the EAP authenticator server) via a WiFi agent 502b stored on the client electronic device. For example, the WiFi agent 502b may be stored and/or executed outside the non-secure zone of the client electronic device. The WiFi agent 502b may be an application stored in the non-secure zone of the client and executed in the normal operating environment.

If the authentication application 501b receives a request for the default client certificate at operation 510b, the authentication application 501b may perform the minimal trusted boot checks registered or otherwise associated with the requested default client certificate. For example, the authentication application 501b may perform the trusted boot checks to confirm that the client electronic device is in an uncompromised state. If the authentication application

501b determines that the client electronic device is not in an uncompromised state (e.g., that the client electronic device is in a compromised state), then the client electronic device may be prevented from performing authentication services (e.g., installing a private key, signing a certificate using the private key stored in the secure zone of the client electronic device, performing encryption/decryption services, and/or the like).

According to various embodiments of the present disclosure, if the authentication application 501b determines that the minimal trusted boot checks satisfied the applicable validation criteria, then at operation 520b, then the authentication application 501b may request enrolment (e.g., attempt to register with) the enterprise network 503b (e.g., the EAP authenticator server). The default client certificate may be communicated with a request for enrollment. According to various embodiments of the present disclosure, the default client certificate and/or request for enrollment may be communicated to the enterprise network 503b (e.g., the EAP authenticator server) directly from the authentication application 501b, or the default client certificate and/or request for enrollment may be communicated to the enterprise network 503b (e.g., the EAP authenticator server) via the WiFi agent 502b.

Thereafter, at operation 530b, the enterprise network 503b (e.g., the EAP authenticator server) and the authentication application 501b may perform an authentication (e.g., a validation). For example, the authentication application 501b may encrypt/decrypt services provided to and/or received from the WiFi agent 502b using a specific encryption module or protocol (e.g., using a PKCS11 interface). The enterprise network 503b (e.g., the EAP authenticator server) and the authentication application 501b may perform authentication using the default key set.

The enterprise network 503b (e.g., the EAP authenticator server) may operatively establish an SSL connection between the enterprise network 503b (e.g., the EAP authenticator server) and the client electronic device using the default client certificate and key.

Thereafter, at operation 540b, the enterprise network 503b (e.g., the EAP authenticator server) may communicate a client certificate and/or key to the client electronic device. For example, if the authentication application 501b is authenticated with the enterprise network 503b (e.g., the EAP authenticator server), then the enterprise network 503b (e.g., the EAP authenticator server) may provide the client electronic device.

Upon receipt of the client certificate and/or key from the enterprise network 503b (e.g., the EAP authenticator server), the authentication application 501b may install the client certificate and/or key. For example, the client electronic device may store and/or install the client certificate and/or key.

Figure 6A:
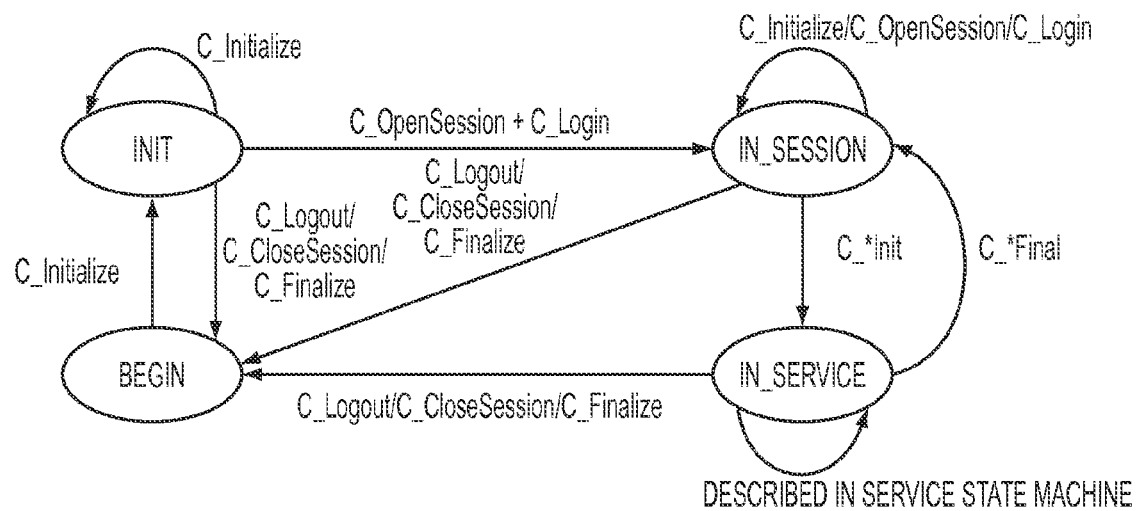
FIGS. 6A and 6B illustrate state diagrams for an authentication procedure according to various embodiments of the present disclosure.
Figure 6B:
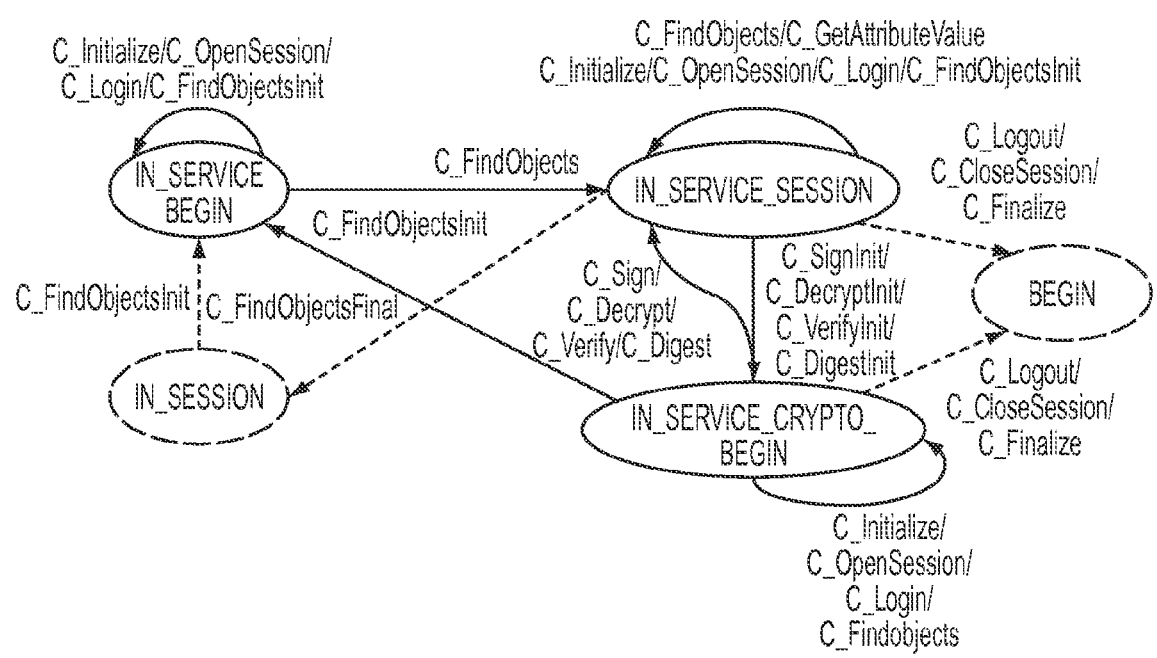

FIGS. 6A and 6B illustrate state diagrams for an authentication procedure according to various embodiments of the present disclosure.

Referring to FIG. 6A, according to various embodiments of the present disclosure, only one session may be allowed with the secure zone of the client electronic device at any given time. According to various embodiments of the present disclosure, only one trustlet instance may exist at any given time.

According to various embodiments of the present disclosure, the authentication application may not honor any other session requests until a current session is closed.

According to various embodiments of the present disclosure, with reference to FIGS. 4D and 6A, the function call "C_Intitialize" when the client electronic device is currently in the INIT state and making the function call "C_OpenSession+C_Login" or "C_Logout/C_CloseSession/C_Finalize" will not be honored because doing so would honor more than one session at a current time.

Similarly, according to various embodiments of the present disclosure, the function call "C_Initialize/C_OpenSession/C_Login" will not be honored when the client electronic device is in the IN-SESSION state and making the "C_*Init" or "C_Logout/C_CloseSession/C_Finalize" function calls because doing so would honor more than one session at a current time.

Referring to FIG. 6B, according to various embodiments of the present disclosure, FindObjects and cryptography operations may be treated different than other operations.

According to various embodiments of the present disclosure, when the client electronic device (e.g., the authentication application) has completed a FindObject operation (e.g., when the authentication application has found the object), the client electronic device may transition to a crypto_begin state.

According to various embodiments of the present disclosure, when the client electronic device (e.g., the authentication application) transitions to a crypto_begin state, the client electronic device (e.g., the authentication application) may lose (e.g., transitions away from) a FindObject state.

With reference to FIG. 6B, the dotted lines associated with function calls and states are function calls and states of a client electronic device such as the client electronic device illustrated in FIG. 6A. The dotted lines transpose the function calls and states associated with the client electronic device illustrated in FIG. 6A onto the state diagram of the client electronic device described in connection with FIG. 6B.

According to various embodiments of the present disclosure, with reference to FIGS. 4D and 6B, the function call "C_Intialize/C_OpenSession/C_Login/C_FindObjectsInit" when the client electronic device is in the IN_Service Begin state will not be honored because doing so would honor more than one session at a current time.

Similarly, the function call "C_Intialize/C_OpenSession/C_Login/C_FindObjectsInit" when the client electronic device is in the In_Service_Session state will not be honored because doing so would honor more than one session at a current time.

Similarly, the function call "C_Intialize/C_OpenSession/C_Login/C_FindObjectsInit" when the client electronic device is in the In_Service_Crypto_Begin state will not be honored because doing so would honor more than one session at a current time.

According to various embodiments of the present disclosure, a client electronic device may be configured to prevent the client electronic device from indefinitely remaining in a given state. For example, the client electronic device (e.g., the authentication application) may perform an erroneous execution of an operation for less than a threshold number of times (e.g., N=10), after which the client electronic device may unblock itself from performing another function call or initiating another (e.g., alternative) session.

According to various embodiments of the present disclosure, the client electronic device (e.g., the authentication application) may monitor states lost during a reboot of the client electronic device. For example, the client electronic device (e.g., the authentication application) may detect lost states by using consistency checks that are performed at an install sequence and/or an initialization sequence. If the client electronic device (e.g., the authentication application)

detects a lost state, then the client electronic device (e.g., the authentication application) may resolve the lost state (e.g., by fixing and/or restoring the lost state). According to various embodiments of the present disclosure, an existing token takes priority over new tokens.

Figure 7A:
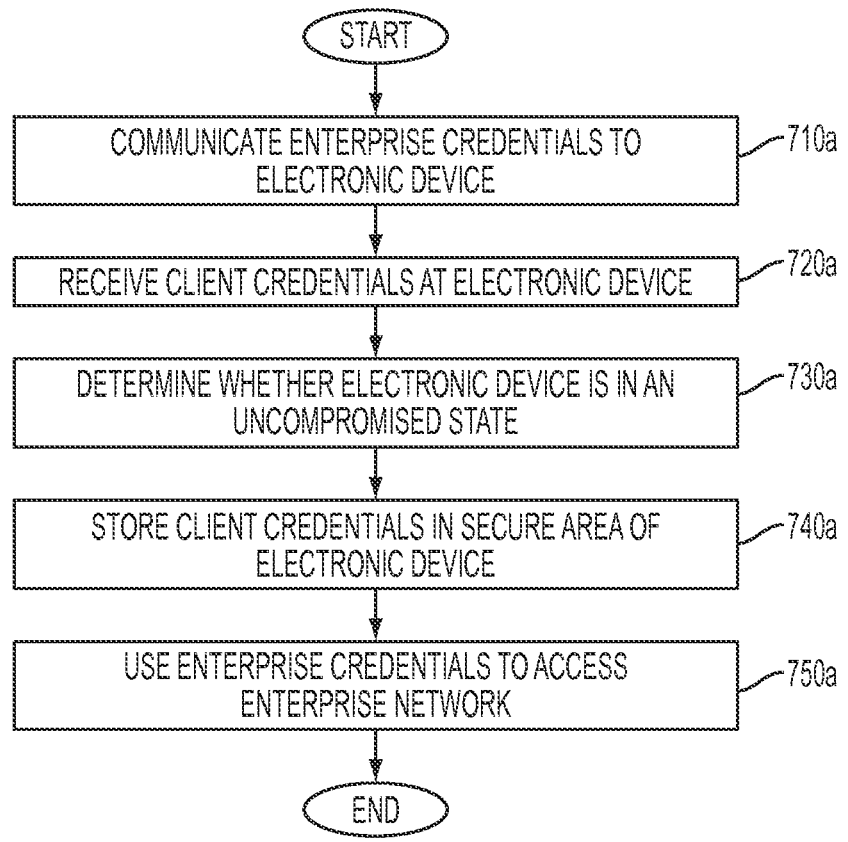
FIG. 7A illustrates a flowchart for authenticating a client electronic device according to various embodiments of the present disclosure.

FIG. 7A illustrates a flowchart for authenticating a client electronic device according to various embodiments of the present disclosure.

At operation 710a, client credentials (e.g., enterprise credentials) are communicated to the client electronic device. An enterprise (e.g., an enterprise network) may communicate the client credentials to the client electronic device. According to various embodiments of the present disclosure, the enterprise (e.g., the enterprise network) may communicate the client credentials directly to the client electronic device. According to various embodiments of the present disclosure, the enterprise (e.g., the enterprise network) may communicate the client credentials to the client electronic device via a gateway. The client credentials may be a private key and corresponding certificate associated with the enterprise (e.g., the enterprise network). The client credentials may be unique for the client electronic device (e.g., the client credentials may be used for a unique identification of the client electronic device in relation to the enterprise network).

At operation 720a, the client electronic device receives the client credentials from the enterprise (e.g., the enterprise network).

At operation 730a, the client electronic device determines whether the client electronic device is an uncompromised state. For example, the client electronic device may determine whether the client electronic device is in an uncompromised state before storing the default credentials in the secure zone of the client electronic device. The client electronic device may determine whether the client electronic device is in an uncompromised state by performing one or more trusted boot checks.

At operation 740a, the client electronic device stores (e.g., installs) the client credentials in the secure zone of the client electronic device. The client electronic device may only store the client credentials in the secure zone of the client electronic device if the client electronic device is in an uncompromised state. For example, the client electronic device may determine whether the client electronic device is in an uncompromised state before storing the client credentials in the secure zone of the client electronic device. The client electronic device may determine whether the client electronic device is in an uncompromised state by performing one or more trusted boot checks.

At operation 750a, the client electronic device uses the client credentials to access the enterprise network. For example, the client electronic device and the enterprise network may perform an authentication procedure to validate the client electronic device using the client credentials.

Figure 7B:
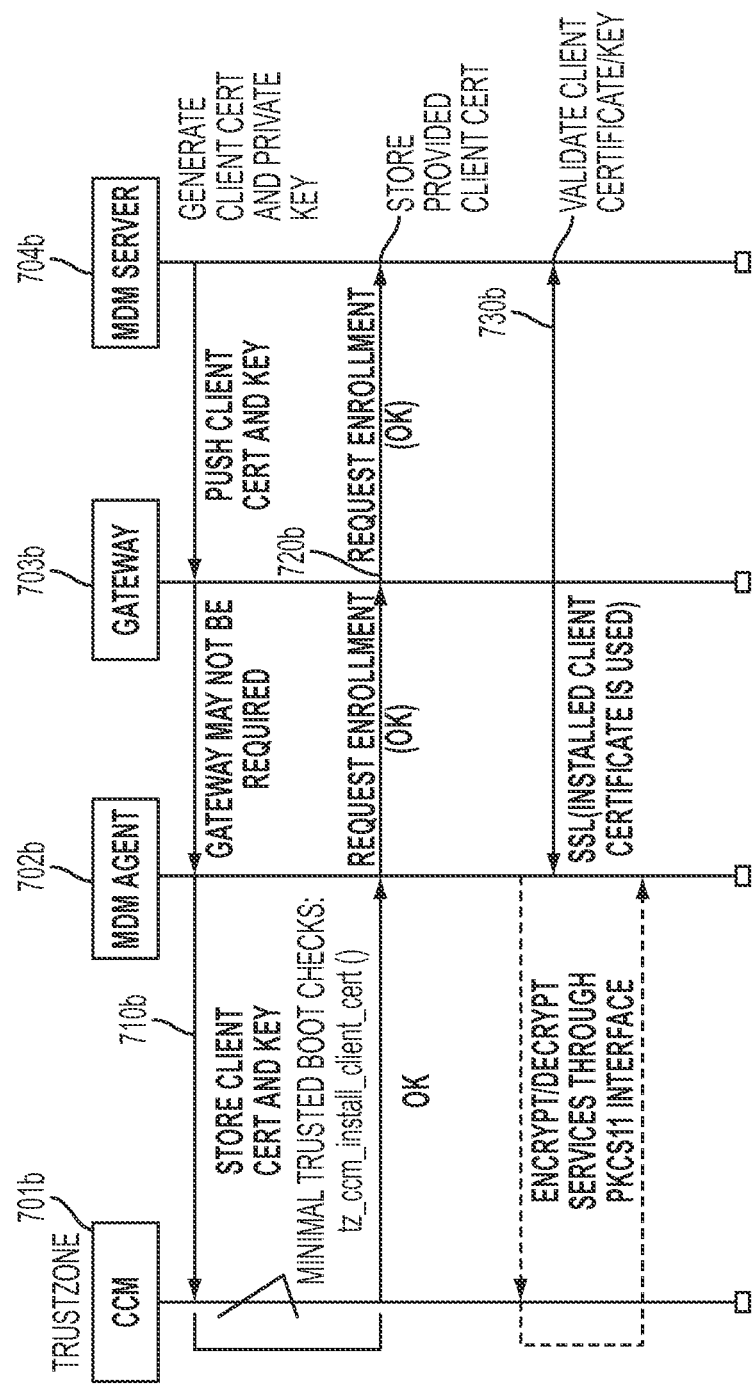
FIG. 7B illustrates a procedure for authenticating a client electronic device according to various embodiments of the present disclosure.

FIG. 7B illustrates a procedure for authenticating a client electronic device according to various embodiments of the present disclosure.

Referring to FIG. 7B, at operation 710b, an enterprise network 704b (e.g., an MDM server) may communicate a client certificate and/or client key (e.g., a private key corresponding to the client certificate). The enterprise network 704b (e.g., the MDM server) may communicate the client certificate and/or client key using a push communication technology. For example, the enterprise network 704b (e.g., the MDM server) may directly communicate the client certificate and/or key to the client electronic device (e.g., the authentication application 710b stored on the client electronic device). As another example, the enterprise network 704b (e.g., the MDM server) may communicate the client certificate and/or client key to the client electronic device via a gateway 703b and/or security agent 702b (e.g., a KNOX agent). For example, the security agent 702b (e.g., the KNOX agent) may be stored and/or executed outside the non-secure zone of the client electronic device. The security agent 702b (e.g., the KNOX agent) may be an application stored in the non-secure zone of the client and executed in the normal operating environment. The enterprise network 704b (e.g., the MDM server) may generate the client certificate and corresponding private key (e.g., client key). The enterprise network 704b (e.g., the MDM server) may communicate the client certificate and/or the client key using a secure or otherwise trusted connection.

According to various embodiments of the present disclosure, upon receipt of the client certificate and/or key from the enterprise network 704b (e.g., the MDM server), the client electronic device may store (e.g., install) the client certificate and/or client key (e.g., private key). According to various embodiments of the present disclosure, the client electronic device may confirm that the client electronic device is in an uncompromised state. The client electronic device may confirm that the client electronic device was boot to an uncompromised state. The client electronic device may determine whether the client electronic device is in an uncompromised state by performing one or more trusted boot checks. According to various embodiments of the present disclosure, the client electronic device may only store the client certificate and client key in the secure zone of the client electronic device if the client electronic device determines that the client electronic device is an uncompromised state.

According to various embodiments of the present disclosure, at operation 720b, the client electronic device (e.g., the authentication application 701b) may communicate a request for enrollment with the enterprise network 704b (e.g., the MDM server or an associated enterprise network). For example, the client electronic device may communicate the request for enrollment through the security agent 702b (e.g., the KNOX agent) and/or the gateway 703b. The client electronic device may communicate the request for enrollment with the enterprise network 704b (e.g., the MDM server) with a client certificate. The client certificate may be wrapped with identification information of the client electronic device.

Upon receipt of the request for enrollment, the enterprise network 704b (e.g., the MDM server) may store the client certificate.

Thereafter, at operation 730b, the enterprise network 704b (e.g., the MDM server) and the client electronic device (e.g., the authentication application 701b) may perform authentication using the client credentials (e.g. the client certificate, the client key (e.g., the private key), and/or the corresponding public key). The enterprise network 704b (e.g., the MDM server) may validate the client electronic device (e.g., in response to the client electronic device attempting to access the enterprise network associated with the enterprise network 704b (e.g., the MDM server)). The authentication application 701b (e.g., via the security agent 702b) and the enterprise network 704b (e.g., the MDM server) may perform an authentication process through a specific encryption module or protocol (e.g., using a PKCS11 interface).

According to various embodiments of the present disclosure, the enterprise network 704b (e.g., the MDM server) may communicate with the security agent 702b and/or the client electronic device using a security protocol. For example, the enterprise network 704*b* (e.g., the MDM server) may communicate with the security agent 72*b* and/or client electronic device using a Secure Sockets Layer (SSL) protocol and the installed client certificate. The enterprise network 704*b* (e.g., the MDM server) may authenticate the client electronic device by validating the client certificate and/or the client key.

Figure 7C:
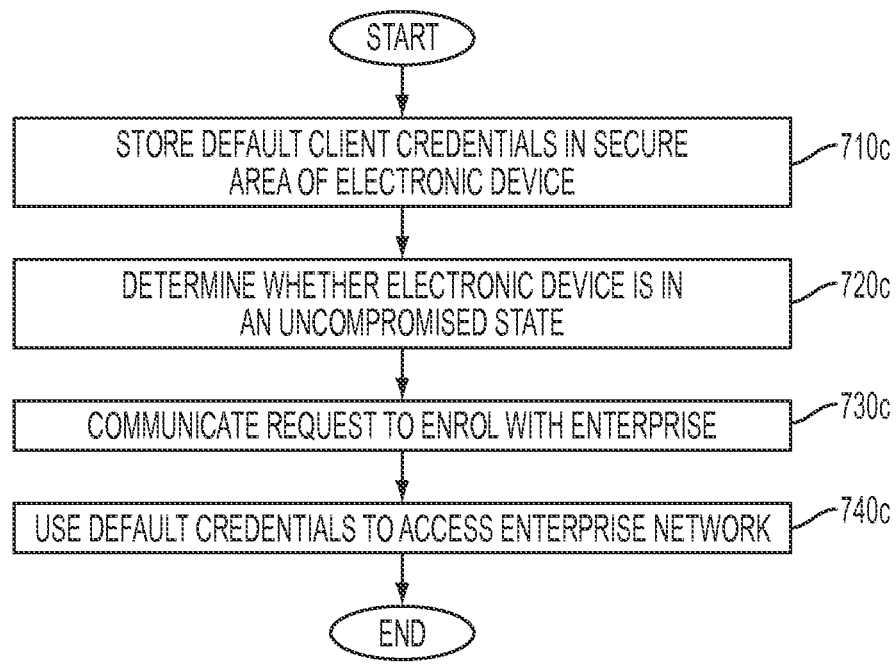
FIG. 7C illustrates a flowchart for authenticating a client electronic device according to various embodiments of the present disclosure.

FIG. 7C illustrates a flowchart for authenticating a client electronic device according to various embodiments of the present disclosure.

Referring to FIG. 7, according to various embodiments of the present disclosure, an enterprise may select to use credentials provided by a third party (e.g., an OEM manufacturer). The enterprise may not want to have to provide a certificate or be required to manage and/or process certificate signing requests. As an example, default client certificates and keys may be used for authentication of a client electronic device.

At operation 710*c*, the client electronic device may store default credentials in the secure zone of the client electronic device. The default credentials may be provided by a third party such as, for example, the OEM manufacturer. The default credentials may correspond to a default certificate and a default private key. According to various embodiments of the present disclosure, an enterprise (e.g., an enterprise network), an application, and/or the like may be registered for use with the default credentials (e.g., the default certificate and/or default key (e.g., private key)). According to various embodiments of the present disclosure, the enterprise (e.g., the enterprise network), the application, and/or the like may be registered for use with the default credentials at time when the default credentials are stored in the secure zone of the client electronic device. According to various embodiments of the present disclosure, the enterprise (e.g., the enterprise network), the application, and/or the like may be registered for use with the default credentials after the default credentials are stored in the secure zone of the client electronic device.

At operation 720*c*, the client electronic device may determine whether the client electronic device is an uncompromised state. For example, the client electronic device may determine whether the client electronic device is in an uncompromised state before registering the enterprise (e.g., the enterprise network), the application, and/or the like may be registered for use with the default credentials. The client electronic device may determine whether the client electronic device is in an uncompromised state by performing one or more trusted boot checks.

At operation 730*c*, the client electronic device communicates a request to enroll or otherwise register with the enterprise (e.g., the enterprise network). For example, the client electronic device communicates a request to enroll or otherwise register with an authentication server of the enterprise network. The client electronic device may communicate the default certificate to the enterprise network with the request to enroll/register with the enterprise (e.g., the enterprise network). For example, the client electronic device may communicate a default certificate to the enterprise network.

At operation 740*c*, the client electronic device uses the default credentials to access the enterprise network. For example, the client electronic device and the enterprise network may perform an authentication procedure to validate the client electronic device using the default credentials.

Figure 7D:
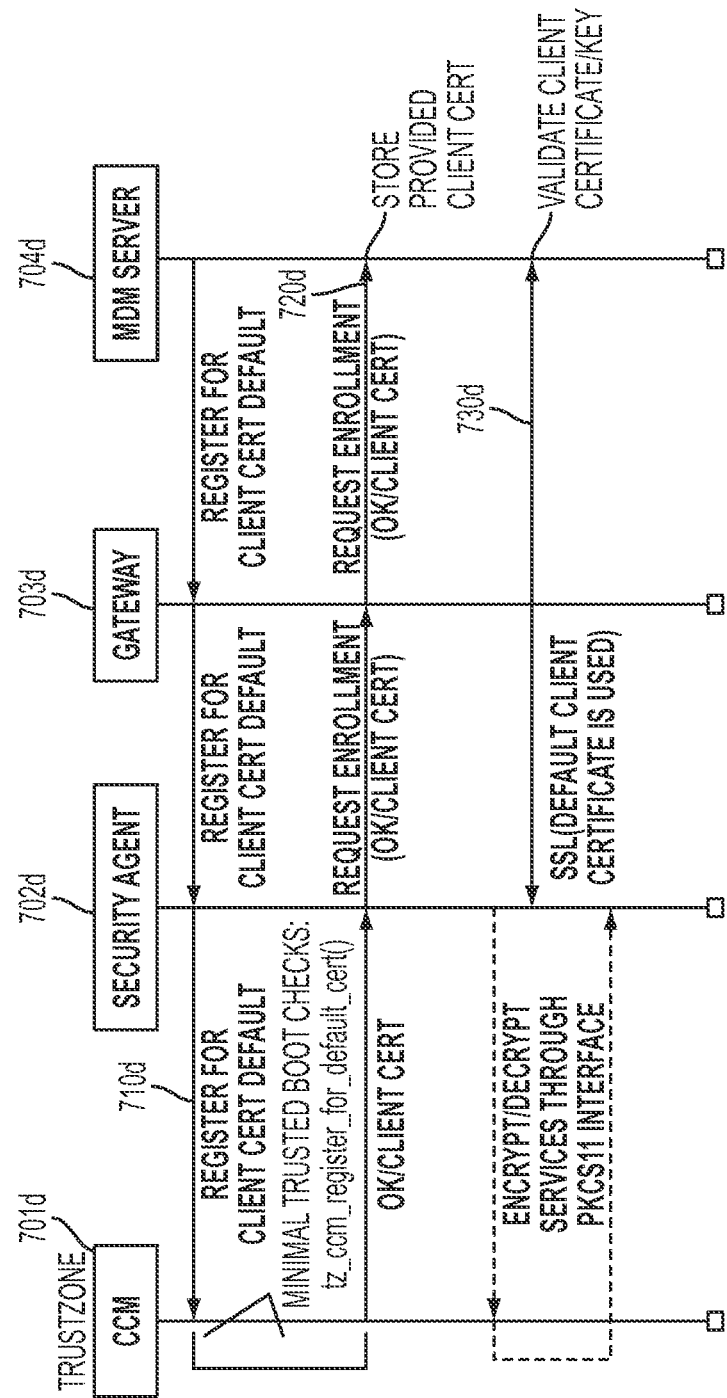
FIG. 7D illustrates a procedure for authenticating a client electronic device according to various embodiments of the present disclosure.

FIG. 7D illustrates a procedure for authenticating a client electronic device according to various embodiments of the present disclosure.

Referring to FIG. 7D, according to various embodiments of the present disclosure, at operation 710*d*, the client electronic device may operatively receive a request to register the client electronic device with an enterprise (e.g., an enterprise network). The client electronic device may operatively receive a request including a default client certificate from an enterprise network 704*d* (e.g., an MDM server). For example, an authentication application 701*d* (e.g., the CCM application) installed on the client electronic device may receive the request including a default client certificate. The authentication application 701*d* may receive the request for a default client certificate directly from the enterprise network 704*d* (e.g., the MDM server), or from the enterprise network 704*d* (e.g., the MDM server) via a gateway 703*d* and/or a security agent 702*d* (e.g., a KNOX agent).

If the authentication application 701*d* receives a request including the default client certificate, then the authentication application 701*d* may perform the minimal trusted boot checks registered or otherwise associated with the requested default client certificate. For example, the authentication application 701*d* may confirm that the client electronic device is in an uncompromised state. The authentication application 701*d* may confirm that the client electronic device is in an uncompromised state before storing the default client credentials (e.g., the default client certificate and default client private key) to ensure that the default client credentials are not compromised.

According to various embodiments of the present disclosure, if the authentication application 701*d* determines that the minimal trusted boot checks satisfied the applicable validation criteria, then the authentication application 701*d* may store the default client credentials.

At operation 720*d*, the client electronic device may communicate a request to enroll the client electronic device with the enterprise (e.g., the enterprise network 704*d*). The default client certificate (e.g., signed with the default client private key) may be communicated with a request for enrollment. According to various embodiments of the present disclosure, the default client certificate and/or request for enrollment may be communicated to the enterprise network 704*d* (e.g., the MDM server) directly from the authentication application 701*d*, or the default client certificate and/or request for enrollment may be communicated to the enterprise network 704*d* (e.g., the MDM server) via the gateway 703*d* and/or a security agent 702*d* (e.g., a KNOX agent).

Upon receipt of the default client certificate, the MDM server stores the client certificate.

Thereafter, at operation 730*d*, the client electronic device, the security agent 702*d* (e.g., the KNOX agent), the gateway 703*d*, and/or the enterprise network 704*d* (e.g., the MDM server) may encrypt/decrypt services provided to the authentication application 730*d* through a specific encryption module or protocol (e.g., using a PKCS11 interface). The client electronic device and the enterprise network 704*d* (e.g., the MDM server) may communicate over an encryption protocol to validate the client credentials (e.g., to authenticate the client electronic device).

According to various embodiments of the present disclosure, the enterprise network 704*d* (e.g., the MDM server) may communicate with the gateway 703*d*, the security agent 702*d* (e.g., KNOX agent), and/or the client electronic device (e.g., the authentication application 701*d*) using a security protocol. For example, the enterprise network 704*d* (e.g., the MDM server) may communicate with the security agent 702*d* and/or client electronic device using a Secure Sockets Layer (SSL) protocol and the installed client certificate. The enterprise network 704*d* (e.g., the MDM server) may authenticate the client electronic device by validating the client certificate and/or the key.

Figure 7E:
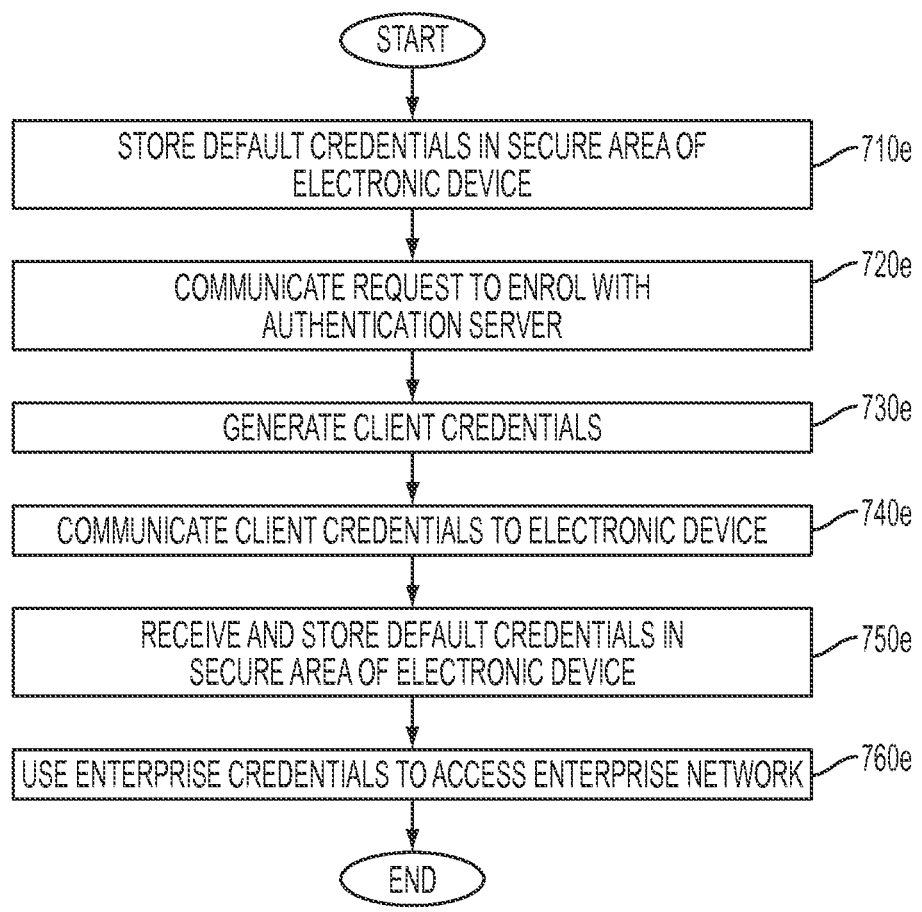
FIG. 7E illustrates a flowchart for authenticating a client electronic device according to various embodiments of the present disclosure.

FIG. 7E illustrates a flowchart for authenticating a client electronic device according to various embodiments of the present disclosure.

Referring to FIG. 7E, at operation 710e, the client electronic device may store default credentials in the secure zone of the client electronic device. The default credentials may be provided by a third party such as, for example, the OEM manufacturer. The default credentials may correspond to a default certificate and a default private key. According to various embodiments of the present disclosure, an enterprise (e.g., an enterprise network), an application, and/or the like may be registered for use with the default credentials (e.g., the default certificate and/or default key (e.g., private key)). According to various embodiments of the present disclosure, the enterprise (e.g., the enterprise network), the application, and/or the like may be registered for use with the default credentials at time when the default credentials are stored in the secure zone of the client electronic device. According to various embodiments of the present disclosure, the enterprise (e.g., the enterprise network), the application, and/or the like may be registered for use with the default credentials after the default credentials are stored in the secure zone of the client electronic device.

At operation 720e, the client electronic device communicates a request to enroll or otherwise register with the enterprise (e.g., the enterprise network), and application, and/or the like. For example, the client electronic device communicates a request to enroll or otherwise register with an authentication server of the enterprise network. The client electronic device may communicate the default certificate to the enterprise network with the request to enroll/register with the enterprise (e.g., the enterprise network). For example, the client electronic device may communicate a default certificate to the enterprise network. The client electronic device may communicate information identifying the client electronic device (e.g., a device ID) to the enterprise. For example, the request to enroll/register with the enterprise may include the information identifying the client electronic device.

At operation 730e, client credentials may be generated. For example, the enterprise (e.g., the enterprise network) may generate the client credentials. The client credentials may include a client certificate and private key. The client credentials may relate to a public credential such as a public key.

At operation 740e, client credentials (e.g., enterprise credentials) are communicated to the client electronic device. An enterprise (e.g., an enterprise network) may communicate the client credentials to the client electronic device. According to various embodiments of the present disclosure, the enterprise (e.g., the enterprise network) may communicate the client credentials directly to the client electronic device. According to various embodiments of the present disclosure, the enterprise (e.g., the enterprise network) may communicate the client credentials to the client electronic device via a gateway. The client credentials may be a private key and corresponding certificate associated with the enterprise network. The client credentials may be unique for the client electronic device (e.g., the client credentials may be used for a unique identification of the client electronic device in relation to the enterprise network).

At operation 750e, the client electronic device receives the client credentials from the enterprise (e.g., the enterprise network). Thereafter, the client electronic device may store the client credentials in the secure zone of the client electronic device. The client electronic device may determine whether the client electronic device is an uncompromised state. For example, the client electronic device may determine whether the client electronic device is in an uncompromised state before storing the default credentials in the secure zone of the client electronic device. The client electronic device may determine whether the client electronic device is in an uncompromised state by performing one or more trusted boot checks. The client electronic device may only store the client credentials in the secure zone of the client electronic device if the client electronic device is in an uncompromised state. For example, the client electronic device may determine whether the client electronic device is in an uncompromised state before storing the client credentials in the secure zone of the client electronic device.

At operation 760e, the client electronic device uses the client credentials to access the enterprise network. For example, the client electronic device and the enterprise network may perform an authentication procedure to validate the client electronic device using the client credentials.

Figure 7F:
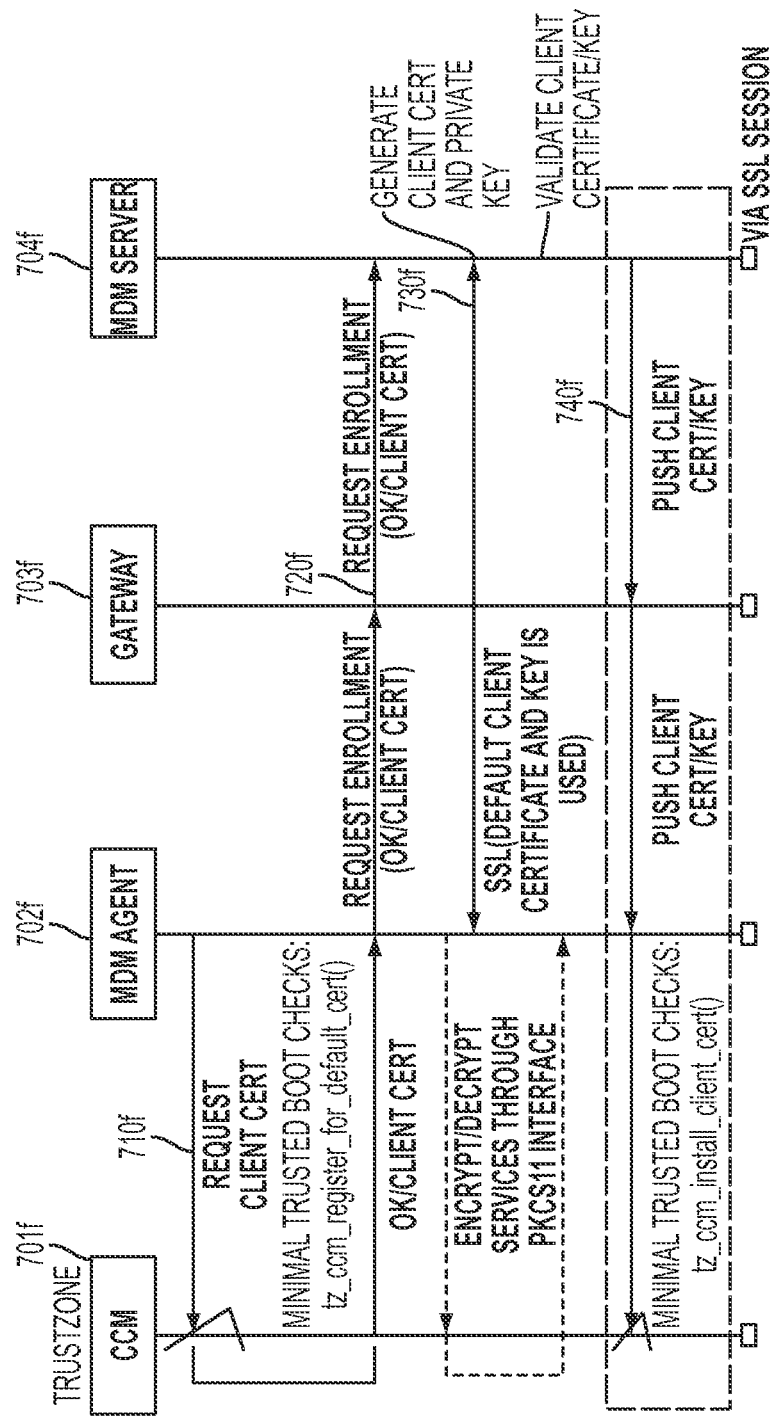
FIG. 7F illustrates a procedure for authenticating a client electronic device according to various embodiments of the present disclosure.

FIG. 7F illustrates a procedure for authenticating a client electronic device according to various embodiments of the present disclosure.

Referring to FIG. 7F, according to various embodiments of the present disclosure, at operation 710f, an authentication application 701f stored in a secure zone of the client electronic device may operatively receive a request for a default client certificate from security agent 702f (e.g., an application stored in a non-secure zone of the client electronic device and that is configured to interface or otherwise communicate with an enterprise (e.g., an enterprise network 704f such as an MDM server) such as a KNOX agent). For example, an authentication application 701f (e.g., the CCM application) installed on the client electronic device may receive the request for a default client certificate.

If the authentication application 701f receives a request for the default client certificate, then the client electronic device (e.g., the authentication application 701f) may confirm that the client electronic device is in an uncompromised state. For example, the authentication application 701f may perform the minimal trusted boot checks registered or otherwise associated with the requested default client certificate.

According to various embodiments of the present disclosure, if the authentication application 701f determines that the minimal trusted boot checks satisfied the applicable validation criteria, then, at operation 720f, the client electronic device may request enrollment with the enterprise (e.g., the enterprise network 704f). For example, the authentication application 701f may communicate a request for enrollment with the enterprise network 704f and the default client certificate to the enterprise network 704f (e.g., the MDM server). According to various embodiments of the present disclosure, the default client certificate and/or request for enrollment may be communicated to the enterprise network 704f (e.g., the MDM server) directly from the authentication application, or the default client certificate and/or request for enrollment may be communicated to the enterprise network 704f (e.g., the MDM server) via the security agent 702f (e.g., the KNOX agent) and/or a gateway 703f.

At operation 730f, the enterprise network 704f (e.g., the MDM server) may generate a client certificate and private key. The enterprise network 704f may generate client credentials (e.g., for access thereto).

According to various embodiments of the present disclosure, the enterprise network 704f may authenticate the client electronic device before generating the client credentials. The enterprise network 704f may authenticate the client electronic device using the default credentials (e.g., the default client certificate and default private key) that may be stored in a secure zone of the client electronic device. For example, the client electronic device (e.g., the authentication application 701f), the security agent 702f (e.g., the KNOX agent), the gateway 703f, and/or the enterprise network 704f (e.g., the MDM server) may perform encrypt/decrypt services provided to the through a specific encryption module or protocol (e.g., using a PKCS11 interface) using the default credentials.

According to various embodiments of the present disclosure, the enterprise network 704f (e.g., the MDM server) may communicate the default credentials with the gateway 703f, the security agent 702f (e.g., the KNOX agent), and/or the client electronic device (e.g., the authentication application 701f) using a security protocol. For example, the enterprise network 704f (e.g., the MDM server) may communicate the default credentials with the security agent 702f (e.g., the KNOX agent) and/or the client electronic device (e.g., the authentication application 701f) using a Secure Sockets Layer (SSL) protocol and the installed client certificate. The enterprise network 704f (e.g., the MDM server) may authenticate the client electronic device by validating the client certificate and/or the key.

At operation 740f, upon receipt of the validated client certificate and/or key (e.g., the signed client certificate), the client electronic device (e.g., the authentication application 701f) may store (e.g., install) the client certificate. For example, the client electronic device may store the client credentials in a secure zone of the client electronic device. The client electronic device may determine whether the client electronic device is an uncompromised state. For example, the client electronic device may determine whether the client electronic device is in an uncompromised state before storing the default credentials in the secure zone of the client electronic device. The client electronic device may determine whether the client electronic device is in an uncompromised state by performing one or more trusted boot checks. The client electronic device may only store the client credentials in the secure zone of the client electronic device if the client electronic device is in an uncompromised state. For example, the client electronic device may determine whether the client electronic device is in an uncompromised state before storing the client credentials in the secure zone of the client electronic device.

Figure 8:
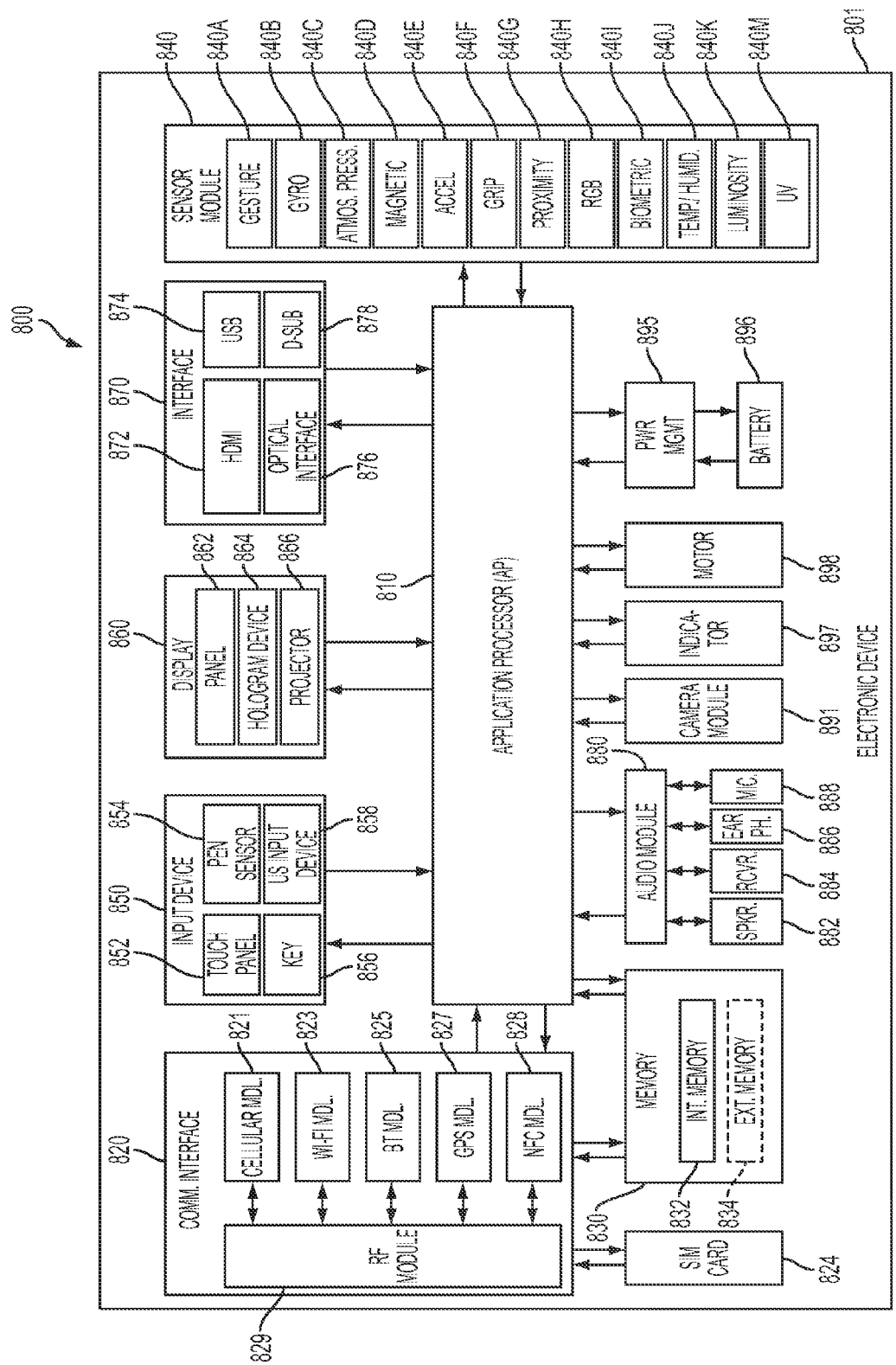
FIG. 8 illustrates a block diagram of hardware according to various embodiments of the present disclosure.

FIG. 8 illustrates a block diagram of hardware according to various embodiments of the present disclosure.

Referring to FIG. 8, hardware 801 may be, for example, a part or all of the electronic device 101. Referring to FIG. 8, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication interface 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication interface 820, and/or the like, may store at non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding to the respective the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amp Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and/or the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., the memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to electronic device 801 via various interfaces. According to various embodiments of the present disclosure, the electronic device 801 may include recording devices (or recording media) such as, for example, Hard Disk Drives (HDD), and/or the like.

The sensor module 840 may measure physical/environmental properties detect operational states associated with electronic device 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and/or the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the electronic device 801 may receive user input from an external device (e.g., a network, computer or server) connected to the electronic device 801 using the communication module 820.

The display module 860 (e.g., the display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to electronic device 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication interface 820. Additionally or alternatively, the interface 870 may include, for example, one or more interfaces for Mobile High-definition Link (MHL), Secure Digital (SD)/MultiMedia Card (MMC), Infrared Data Association (IrDA), and/or the like.

The audio module 880 may encode/decode sound into electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the electronic device 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 801 may include wired or wireless charging. The charger IC may charge a battery, may prevent excessive voltage or excessive current from a charger from entering the electronic device 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 896, and/or the like.

As an example, the battery 896 may supply power to the electronic device 801. As an example, the battery 896 may be a rechargeable battery, a solar battery, and/or the like.

The indicator 897 may indicate one or more states (e.g., boot status, message status, charge status, and/or the like) of the electronic device 801 or a portion thereof (e.g., AP 810). Motor 898 may convert an electrical signal into a mechanical vibration.

Although not shown, the electronic device 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. An electronic device comprising:
a memory, and
at least one processor configured to:
store a unique key and a certificate matching the unique key in a first portion of the memory,
receive an indication to initiate establishing a connection with an enterprise network,
initiate an authentication operation to establish the connection with the enterprise network when the electronic device is secure,
wherein an application executed within a secure operating environment of the electronic device determines whether the electronic device is secure in response to receiving an indication to initiate the establishing of the connection with the enterprise network,
wherein the application executed within the secure operating environment prevents the electronic device from initiating the authentication operation when the electronic device is not secure,
wherein the first portion of the memory is associated with the secure operating environment,
wherein at least one of the unique key and the certificate matching the unique key identifies the electronic device,
wherein unsecure data is stored in a second portion of the memory different from the first portion of the memory, and
wherein the second portion of the memory is associated with a non-secure operating environment.

2. The electronic device of claim 1, wherein the secure operating environment is identified by a manufacturer of the electronic device.

3. The electronic device of claim of claim 1, wherein the unique key comprises a public sub-key and a private sub-key.

4. The electronic device of claim 1, wherein the determining of whether the electronic device is secure is performed before data stored in the portion of the memory associated with the secure operating environment is accessed or before additional data is stored in the portion of the memory associated with the secure operating environment.

5. The electronic device of claim 1, wherein the certificate matching the unique key stored in the portion of the memory associated with the secure operating environment is used in the authentication operation.

6. The electronic device of claim 1, wherein the unique key and the certificate matching the unique key are stored in the first portion of the memory associated with the secure operating environment during manufacture of the electronic device.

7. The electronic device of claim 1, wherein the certificate matching the unique key includes data that uniquely identifies the electronic device.

8. The electronic device of claim 1, wherein the data that uniquely identifies the electronic device is at least one of human-readable and machine-readable.

9. The electronic device of claim 1,
wherein the non-secure operating environment is configured to communicate with the secure operating environment.

10. The electronic device of claim 9, wherein the non-secure operating environment and the secure operating environment are configured to communicate using a cryptographic token interface.

11. The electronic device of claim 1, wherein cryptographic evidence stored in the first portion of the memory associated with the secure operating environment is used by the enterprise network to identify the electronic device after the authentication operation is initiated.

12. The electronic device of claim 11, wherein the cryptographic evidence used by the enterprise network to identify the electronic device corresponds to data associated with at least one of the unique key and the certificate matching the unique key.

13. The electronic device of claim 1, wherein the at least one processor is further configured to run a key generator that randomly generates a private key/public key pair within the secure operating environment when it is determined that the electronic device is secure.

14. The electronic device of claim 13, wherein the key generator is an entropy hardware backed key generator.

15. The electronic device of claim 13,
wherein the at least one processor is configured to receive, from a device manager, an instruction to generate at least one of a client credential and an application credential, and
wherein the key generator randomly generates the private key/public key pair in response to the instruction to generate the at least one of the client credential and the application credential.

16. The electronic device of claim 15, wherein the at least one of the client credential and the application credential is stored in the first portion of the memory associated with the secure operating environment.

17. The electronic device of claim 13, wherein the application executed within the secure operating environment prevents the private key of the generated private key/public key pair from being communicated outside the secure operating environment of the electronic device.

18. The electronic device of claim 1,
wherein the at least one processor is further configured to:
transmit a certificate matching a credential stored in the portion of the memory associated with the secure operating environment to a Certification Authority (CA), and
receive a signed certificate corresponding to the certificate matching the credential stored in the portion of the memory associated with the secure operating environment, and wherein the signed certificate is signed by the CA.

19. The electronic device of claim 18, wherein at least one of the certificate matching the credential stored in the portion of the memory associated with the secure operating environment and the signed certificate signed by the CA is transmitted or received using one or more of a Simple Certificate Enrollment Protocol (SCEP), a Certificate Management Protocol (CMP), and a Certificate Management over Cryptographic Message Syntax (CMS) (CMC) protocol.

20. The electronic device of claim 1,
wherein the non-secure operating environment comprises a security agent, and
wherein the security agent is configured to communicate user credentials to the secure operating environment.

21. The electronic device of claim 20, wherein the user credentials comprise one or more of a private key, a certificate, and a password.

22. The electronic device of claim 20, wherein the security agent includes a Trusted User Interface (TUI).

23. The electronic device of claim 20, wherein the security agent is configured to communicate Public-Key Cryptography Standards #11 (PKCS11) passwords to the secure operating environment.

24. The electronic device of claim 20, wherein the security agent is further configured to run an application for at least one of recording failed login attempts and thwarting keylogger attacks.

25. The electronic device of claim 20,
wherein at least one credential is stored in the first portion of the memory associated with the secure operating environment, and
wherein the at least one credential is configured to be non-transferable to another electronic device.

26. The electronic device of claim 25, wherein the at least one credential is encrypted using an encryption that is unique to the electronic device.

27. The electronic device of claim 25, wherein the at least one credential comprises cryptographic data that is encrypted using an encryption that is unique to the electronic device.

28. The electronic device of claim 1,
wherein the secure operating environment further comprises a secure element (SE), and
wherein the SE stores cryptographic data.

29. A method for performing an authentication operation, the method comprising:
receiving, by the electronic device, a unique key and a certificate matching the unique key;
storing the unique key and the certificate matching the unique key in a portion of memory associated with a secure operating environment of the electronic device;
receiving, at the electronic device, an indication to initiate establishing a connection with an enterprise network;
determining, using an application executed within the secure operating environment of the electronic device, whether the electronic device is secure in response to receiving the indication to initiate the establishing of the connection with the enterprise network; and
initiate an authentication operation to establish the connection with the enterprise network when it is determined that the electronic device is secure,
wherein the application executed within the secure operating environment prevents the electronic device from initiating the authentication operation when it is determined that the electronic device is not secure,
wherein at least one of the unique key and the certificate matching the unique key identifies the electronic device, and
wherein unsecure data is stored in a portion of the memory associated with a non-secure operating environment of the electronic device.

30. The method of claim 29, wherein the secure operating environment is identified by a manufacturer of the electronic device.

31. The method of claim 29, wherein the unique key comprises a public sub-key and a private sub-key.

32. The method of claim 29, wherein the certificate matching the unique key stored in the portion of the memory associated with the secure operating environment is used in the authentication operation.

33. The method of claim 29, wherein the determining of whether the electronic device is secure is performed before data stored in the portion of the memory associated with the secure operating environment is accessed or before additional data is stored in the portion of the memory associated with the secure environment.

34. The method of claim 29, wherein the unique key and the certificate matching the unique key are stored in the portion of the memory associated with the secure operating environment during manufacture of the electronic device.

35. The method of claim 29, wherein the certificate matching the unique key includes data that uniquely identifies the electronic device.

36. The method of claim 29, wherein the data that uniquely identifies the electronic device is at least one of human-readable and machine-readable.

37. The method of claim 29, further comprising:
communicating data between the non-secure operating environment and the secure operating environment of the electronic device.

38. The method of claim 37, wherein the data is communicated between the non-secure operating environment and the secure operating environment using a cryptographic token interface.

39. The method of claim 29, wherein cryptographic evidence stored in the portion of the memory associated with the secure operating environment is used by the enterprise network to identify the electronic device after the authentication operation is initiated.

40. The method of claim 29, wherein the cryptographic evidence used by the enterprise network to identify the electronic device corresponds to data associated with at least one of the unique key and the certificate matching the unique key.

41. The method of claim 29, further comprising:
running, in the secure operating environment, a key generator that randomly generates a private key/public key pair when it is determined that the electronic device is secure.

42. The method of claim 41, wherein the key generator is an entropy hardware backed key generator.

43. The method of claim 41, further comprising:
receiving, at a security agent operating in the non-secure operating environment of the electronic device, a request to generate at least one of a client credential and an application credential from a device manager;
transmitting, from the security agent to the secure operating environment, an instruction to generate the at least one of the client credential and the application credential,
wherein the key generator randomly generates the private key/public key pair in response to the secure operating environment receiving the instruction to generate the at least one of the client credential and the application credential.

44. The method of claim 43, further comprising:
storing the at least one of the client credential and the application credential in the portion of the memory associated with the secure operating environment.

45. The method of claim 41, wherein the application executed within the secure operating environment of the electronic device prevents the private key of the generated private key/public key pair from being communicated outside the secure operating environment of the electronic device.

46. The method of claim 29, further comprising:
transmitting, by the electronic device, a certificate matching a credential stored in the portion of the memory associated with the secure operating environment to a Certification Authority (CA);
receiving, by the electronic device, a signed certificate corresponding to the certificate matching the credential stored in the portion of the memory associated with the secure operating environment; and
storing, by the electronic device, the signed certificate in the portion of the memory associated with the secure operating environment,
wherein the signed certificate is signed by the CA.

47. The method of claim 46, wherein
at least one of the certificate matching the credential stored in the portion of the memory associated with the secure operating environment and the signed certificate signed by the CA is transmitted or received using one or more of a Simple Certificate Enrollment Protocol (SCEP), a Certificate Management Protocol (CMP), and a Certificate Management over Cryptographic Message Syntax (CMS) (CMC) protocol.

48. The method of claim 29,
wherein the non-secure operating environment of the electronic device comprises a security agent, and
wherein the security agent is configured to communicate user credentials to the secure operating environment of the electronic device.

49. The method of claim 48, wherein the user credentials comprise one or more of a private key, a certificate, and a password.

50. The method of claim 48, wherein the security agent includes a Trusted User Interface (TUI).

51. The method of claim 48, further comprising:
communicating, by the security agent, Public-Key Cryptography Standards #11 (PKCS11) passwords to the secure operating environment.

52. The method of claim 48, further comprising:
running, by the security agent, at least one of an application for recording failed login attempts and an application for thwarting keylogger attacks.

53. The method of claim 48,
wherein at least one credential is stored in the portion of the memory associated with the secure operating environment, and
wherein the at least one credential is configured to be non-transferable to another electronic device.

54. The method of claim 53, further comprising:
encrypting the at least one credential using an encryption that is unique to the electronic device.

55. The method of claim 53, wherein the at least one credential comprises cryptographic data that is encrypted using an encryption that is unique to the electronic device.

56. The method of claim 29, further comprising:
storing cryptographic data in a Secure Element (SE) of the electronic device, wherein the secure operating environment includes the SE.

* * * * *